US011860071B2

(12) United States Patent
Braun et al.

(10) Patent No.: US 11,860,071 B2
(45) Date of Patent: Jan. 2, 2024

(54) LOSSLESS CRYO-GRID PREPARATION BY CONTROLLED SAMPLE EVAPORATION

(71) Applicant: UNIVERSITAT BASEL, Basel (CH)

(72) Inventors: Thomas Braun, Munchenstein (CH); Stefan Arnold, Uerikon (CH); Henning Stahlberg, Binningen (CH)

(73) Assignee: UNIVERSITAT BASEL, Basel (CH)

( * ) Notice: Subject to any disclaimer, the term of this patent is extended or adjusted under 35 U.S.C. 154(b) by 1178 days.

(21) Appl. No.: 16/342,529

(22) PCT Filed: Oct. 17, 2017

(86) PCT No.: PCT/EP2017/076467
§ 371 (c)(1),
(2) Date: Apr. 17, 2019

(87) PCT Pub. No.: WO2018/073242
PCT Pub. Date: Apr. 26, 2018

(65) Prior Publication Data
US 2019/0250078 A1 Aug. 15, 2019

(30) Foreign Application Priority Data
Oct. 17, 2016 (EP) .................... 16194230

(51) Int. Cl.
G01N 1/00 (2006.01)
G01N 1/28 (2006.01)
G01N 1/42 (2006.01)
G01N 1/44 (2006.01)

(52) U.S. Cl.
CPC ............. *G01N 1/2813* (2013.01); *G01N 1/42* (2013.01); *G01N 1/44* (2013.01)

(58) Field of Classification Search
None
See application file for complete search history.

(56) References Cited

U.S. PATENT DOCUMENTS

2012/0241607 A1   9/2012 Bose et al.

FOREIGN PATENT DOCUMENTS

| CN | 1478920 | 3/2004 |
| CN | 1605566 | 4/2005 |
| CN | 104198242 | 12/2014 |

(Continued)

Primary Examiner — Jyoti Nagpaul
(74) Attorney, Agent, or Firm — JMB Davis Ben-David

(57) ABSTRACT

Method for preparing a sample, wherein the sample is provided as a thin film on a support structure; the temperature of the support structure is adjusted to a value above the dew point temperature of the environment to decrease the film thickness, light is directed at the support structure, an intensity value of the transmitted light is measured, and the support structure is automatically inserted into a liquid cryogen dependent on the measured intensity value. The application further relates to a system comprising a support structure, a temperature-controlled stage for keeping the support structure at a pre-defined temperature, a transfer mechanism for moving the support structure into a container containing a liquid cryogen, a light source, a photodetector for measuring an intensity value of the transmitted light, and a control device for triggering the transfer mechanism dependent on the measured intensity value.

15 Claims, 7 Drawing Sheets

(56) References Cited

FOREIGN PATENT DOCUMENTS

| | | |
|---|---|---|
| CN | 104215580 | 12/2014 |
| CN | 104561229 | 4/2015 |
| EP | 2381236 | 10/2011 |
| EP | 2853847 | 4/2015 |
| EP | 3018467 | 5/2016 |
| EP | 3018467 | * 11/2016 |
| JP | H04-090721 | 7/1994 |
| JP | H07-333120 | 12/1995 |
| WO | 2013109406 | 7/2013 |

* cited by examiner

LOSSLESS CRYO-GRID PREPARATION BY CONTROLLED SAMPLE EVAPORATION

CROSS-REFERENCE TO RELATED APPLICATIONS

This is the U.S. National Stage of International Patent Application No. PCT/EP2017/076467 filed on Oct. 17, 2017, which was published in English under PCT Article 21(2), and which in turn claims the benefit of European Patent Application No. 16194230.5 filed on Oct. 17, 2016.

The invention relates to a preparation method for preparing a sample for electron microscopy and a corresponding system.

In recent years, transmission electron microscopy (TEM) of vitrified specimens (cryo-EM; Dubochet, J., Adrian, M., Chang, J. J., Homo, J. C., Lepault, J., McDowall, A. W., Schultz, P., 1988. Cryo-electron microscopy of vitrified specimens. Q. Rev. Biophys. 21, 129-228) has become a powerful technique for the high-resolution structural analysis of biological matter (Liao, M., Cao, E., Julius, D., Cheng, Y., 2013. Structure of the TRPV1 ion channel determined by electron cryo-microscopy. Nature 504, 107-112), and is now increasingly recognized as a mainstream tool in biology (Callaway, E., 2015. The revolution will not be crystallized: a new method sweeps through structural biology. Nature 525, 172-174; Kuhlbrandt, W., 2014. Biochemistry. The resolution revolution. Science 343, 1443-1444; Nogales, E., 2015. The development of cryo-EM into a mainstream structural biology technique. Nat. Methods 13, 24-27.) Several technical achievements have made this development possible, the most prominent being the recent introduction of direct electron detection (DED) cameras, and the availability of improved data processing algorithms (Grigorieff, N., 2007. FREALIGN: high-resolution refinement of single particle structures. J. Struct. Biol. 157, 117-125; Lyumkis, D., Brilot, A. F., Theobald, D. L., Grigorieff, N., 2013. Likelihood-based classification of cryo-EM images using FREALIGN. J. Struct. Biol. 183, 377-388; Scheres, S. H. W., Chen, S., 2012. Prevention of overfitting in cryo-EM structure determination. Nat. Methods 9, 853-854).

Cryogenic sample-grid (cryo-EM grid) preparation and imaging methods ensure that biological specimens withstand the ultra-high vacuum inside electron microscopes, reduce effects of radiation damage, and allow their investigation while trapped at physiological conditions that conserve the structural arrangement of the biomolecules (Baker, L. A., Rubinstein, J. L., 2010. Chapter Fifteen-Radiation Damage in Electron Cryomicroscopy. Methods Enzymol; Dubochet, J., Adrian, M., Chang, J. J., Homo, J. C., Lepault, J., McDowall, A. W., Schultz, P., 1988. Cryo-electron microscopy of vitrified specimens. Q. Rev. Biophys. 21, 129-228; Lepault, J., Booy, F. P., Dubochet, J., 1983. Electron microscopy of frozen biological suspensions. J. Microsc. 129, 89-102).

However, these preparation methods have not improved significantly over the last 20 years and have some major drawbacks: In particular, a 2-4 μl sample volume is required, and 99.9% of the sample volume is lost during grid preparation, due to an extensive blotting step made with filter paper (Kemmerling, S., Ziegler, J., Schweighauser, G., Arnold, S. A., Giss, D., Muller, S. A., Ringler, P., Goldie, K. N., Goedecke, N., Hierlemann, A., Stahlberg, H., Engel, A., Braun, T., 2012. Connecting μ-fluidics to electron microscopy. J. Struct. Biol. 177, 128-134).

Furthermore, blotting with filter paper can lead to protein aggregation or denaturation. The current state of the art sample preparation methods are recognized as one of the most significant limitations in cryo-EM (Glaeser, R. M., 2016. How good can cryo-EM become? Nat Methods 13, 28-32).

Improved cryo-EM grid preparation strategies that reduce sample consumption are now an essential requirement. A device that combines ink-jet picoliter dispensing with a plunge-freezing apparatus was presented in 2012 (Jain, T., Sheehan, P., Crum, J., Carragher, B., Potter, C. S., 2012. Spotiton: a prototype for an integrated inkjet dispense and vitrification system for cryo-TEM. J. Struct. Biol. 179, 68-75), and was recently refined by the use of self-blotting grids to allow cryo-grid preparation in combination with ink-jet spotting (Razinkov, I., Dandey, V. P., Wei, H., Zhang, Z., Melnekoff, D., Rice, W. J., Wigge, C., Potter, C. S., Carragher, B., 2016. A new method for vitrifying samples for cryoEM. J. Struct. Biol. 195, 190-198).

In particular, cryo-grid sample preparation methods of the prior art often result in vitrified sample films of varying thickness and quality, which leads to a reduction in image quality or salt artifacts by uncontrolled water evaporation.

Therefore, the object of the present invention is to provide a method for preparing a sample that is improved with respect to the above mentioned disadvantages of the prior art.

This objective is attained by the subject matter of the independent method claim 1, and the independent system claim 10. Dependent claims 2 to 9 represent embodiments of the method, and dependent claims 11 to 15 represent embodiments of the system. The invention is described in detail hereafter.

A first aspect of the invention relates to a method for preparing a sample on a support structure, wherein
  the sample is provided as a thin film having a film thickness on a support structure;
  the temperature of the support structure is adjusted to a value above the dew point temperature of the environment, such that the film thickness decreases;
  light is directed at the support structure;
  at least one intensity value of the light transmitted by the support structure is measured;
  the support structure is automatically inserted into a liquid cryogen dependent on the at least one measured intensity value, such that the sample is cooled down to an amorphous solid.

This has the advantage that thinning of the sample film on the grid can be realized without paper blotting- and spotting and particularly requires total sample volumes of just a few nanoliters (e.g., 3-20 nL). In particular, it is possible by means of the method to directly 'write' the sample for example on holey carbon EM grids by a microcapillary and subsequently vitrify the deposited liquid, producing thin layers of vitrified specimen in the holes of the carbon film.

Advantageously, the combination of evaporation of the sample at a controlled temperature with monitoring evaporation by film thickness measurement allows to automatically prepare samples with defined and reproducible film thickness, which improves image quality of electron micrographs and avoids salt artifacts by uncontrolled water evaporation.

The support structure may be or comprise a known electron microscopy (EM) grid with a holey carbon film or any other suitable structure.

Sample transfer onto the support structure can be performed in multiple ways depending on the physical and chemical properties of the sample. (i) Direct deposition and subsequent spreading of a nanoliter volume droplet on the support surface by surface tension effects. (ii) Deposition of a nanoliter volume droplet on the support surface, followed by re-aspiration of sample with a volume smaller than the initially deposited volume. (iii) Deposition of a nanoliter volume droplet on the support structure surface, followed by a relative movement between the support structure and the liquid handling system while the liquid bridge between the two is still established in order to spread the deposited sample on the support structure. (iv) Deposition of a nanoliter volume droplet on the support structure surface in combination with a relative movement of the support structure and the liquid handling system during deposition in order to spread the deposited sample on the support structure.

Herein a nl (nanoliter) amount or volume is particularly a volume in the range from 1 nl to 100 nl, more particularly 1 nl to 20 nl.

In certain embodiments, the support structure is provided on a temperature-controlled stage.

In certain embodiments, the temperature of the support structure is adjusted to the dew point temperature of the environment in a first step, and the temperature of the support structure is adjusted to a temperature above the dew point temperature of the environment in a second step following the first step.

In certain embodiments, the support structure is automatically inserted into the liquid cryogen when the at least one measured intensity value exceeds a pre-determined threshold.

In certain embodiments, the temperature of the support structure is adjusted to a value 2° to 8° above the dew point temperature of the environment.

In particular, increasing the temperature of the support structure refers to setting a target temperature above the dew point temperature, particularly 2° to 8° above the dew point temperature, wherein the temperature of the support structure increases from the initial temperature to the target temperature during a lag time.

In certain embodiments, the film thickness is decreased by blotting or re-aspiration prior to adjusting the temperature to a value above the dew point temperature of the environment.

Such a pre-thinning step has the advantage that during controlled evaporation of the sample, the sample is only slightly concentrated if the sample film is already thin before controlled evaporation.

In certain embodiments, the wavelength of the light is in the near infrared range, wherein particularly the wavelength is 780 nm or more.

Using infrared light at 780 nm for thickness determination of the sample film has the advantage that the light is not significantly absorbed by water or biological material.

Alternatively, for example a wavelength of 405 nm can also be used.

In certain embodiments, the light directed at the sample comprises at least light of a first wavelength particularly in the range between 600 nm and 900 nm, more particularly in the range between 780 nm and 880 nm or in the range between 630 nm and 670, and light of a second wavelength, particularly in the range between 350 nm and 500 nm, more particularly in the range between 405 nm and 450 nm.

In other words, a combination of two wavelengths (e.g. 405 nm and 780 nm) can be used to illuminate the sample simultaneously. From the temporal spacing of the two interference peaks, a specific sample evaporation rate can be calibrated.

For example, the first wavelength may be 780 nm. For example, the second wavelength may be 405 nm, 445 nm, or 450 nm.

In certain embodiments, the distance between the first wavelength and the second wavelength is 300 nm to 400 nm.

In certain embodiments, a first light beam comprising the first wavelength and a second light beam comprising the second wavelength is directed at the sample, wherein the intensity of the first light beam transmitted by the sample and the intensity of the second light beam transmitted by the sample are separately detected.

In certain embodiments, the first light beam and the second light beam are merged, wherein the merged light beam is directed at the support structure.

In certain embodiments, the light transmitted by the sample is split into a first transmitted light beam and a second transmitted light beam prior to detection of light intensity.

In certain embodiments, the light is directed at the support structure along a light path (L) which is perpendicular to the surface of the support structure.

In particular, such a perpendicular setup has the advantage that the light illuminates the positions of the support structure (e.g. EM grid), which are imaged in a subsequent electron micrograph.

Furthermore, the clarity of the interference pattern constituting part of the measured light intensity signal is best when a perpendicular setup is used.

In certain embodiments, the sample is provided onto the support structure by aspirating a pre-defined amount of the sample into a capillary and dispensing the sample onto the support structure by means of the capillary.

In certain embodiments, the support structure is brought into a vertical position, particularly by pivoting, prior to insertion into the liquid cryogen.

In certain embodiments, an additional calibration step is performed, wherein the light is directed at a reference support structure that is free from the sample, and wherein at least one reference intensity value of the light transmitted by the reference support structure is measured, and wherein the support structure carrying the sample is automatically inserted into the liquid cryogen dependent on the at least one measured intensity value and the at least one reference intensity value, particularly on the ratio of the at least one measured intensity value and the at least one reference intensity value. Additionally, a system mixing two wavelengths enables an absolute calibration of the layer thickness.

Such a reference signal, also referred to as 'dry signal' (and therefore also the signal with sample film on the grid) depends on the grid type and mesh size. Therefore, an advantage of the described embodiment is that by means of the reference signal, thickness measurements of the sample film can be performed independently of the grid type and mesh size.

In certain embodiments, the support structure is removed with the vitrified sample from the liquid cryogen.

In certain embodiments, the sample is immersed in a conditioning buffer prior to providing the sample on the support structure. This allows diffusion-controlled sample conditioning, e.g. for desalting or exchange of buffer prior to deposition on the support structure.

Diffusion-controlled sample conditioning prior to sample preparation is especially advantageous in combination with controlled sample evaporation, because the salt concentration of the sample increases during evaporation.

A second aspect of the invention relates to a system for preparing a sample on a support structure, particularly for applying the method according to the first aspect of the invention, comprising
- a support structure that is configured to accommodate a sample,
- a temperature-controlled stage that is configured to keep the support structure at a pre-defined temperature when the support structure is arranged on the temperature-controlled stage,
- a transfer mechanism that is configured to move the support structure from the temperature-controlled stage into a container containing a liquid cryogen so that the sample on the support structure contacts the cryogen, wherein the system comprises
- a light source that is configured to provide light directed at the support structure,
- a photodetector that is configured to measure at least one intensity value of the light transmitted by the support structure,
- a control device that is configured to receive the measured intensity value from the photodetector and trigger the transfer mechanism dependent on the at least one measured intensity value, such that the support structure is inserted into the container containing the liquid cryogen.

The combination of a temperature-controlled stage and an optical measurement device consisting of the light source and the photodetector advantageously allows controlled sample evaporation and preparation of cryo-grids at a defined and reproducible film thickness. This improves image quality of electron micrographs and avoids salt artifacts by uncontrolled water evaporation.

In certain embodiments, the light source is adapted to emit the light along a light path, wherein the support structure and the photodetector are arranged along the light path, such that at least a part of the light travels from the light source along the light path via the support structure to the photodetector, wherein particularly the support structure is arranged perpendicular to the light path.

In certain embodiments, the system comprises a first adapter configured to hold the support structure, wherein the transfer mechanism is configured to be connected to the first adapter holding the support structure and to move the support structure into a container containing a liquid cryogen so that the sample on the support structure contacts the cryogen.

In certain embodiments, the first adapter comprises tweezers for holding the support structure.

In certain embodiments, the transfer mechanism is configured to pivot the first adapter together with the support structure into a vertical position above the container and to move the first adapter and the support structure downwards after the pivoting so that the sample on the support structure contacts the cryogen in the container.

In certain embodiments, the system comprises a first adapter configured to hold the support structure, wherein the transfer mechanism is configured to be connected to the first adapter holding the support structure, and wherein the transfer mechanism is configured to pivot the first adapter together with the support structure into a vertical position above the container and to move the first adapter and the support structure downwards after the pivoting so that the sample on the support structure contacts the cryogen in the container.

In certain embodiments, the system comprises a liquid handling system comprising a dispensing head, wherein the liquid handling system is configured to aspirate and dispense a volume of a sample via the dispensing head.

In certain embodiments, the system comprises a translation stage assembly that is configured to move the temperature-controlled stage relative to the liquid handling system, such that the dispensing head and the support structure can be brought in close proximity to each other so as to transfer the sample from the liquid handling system to the support structure.

In certain embodiments, the translation stage assembly may comprise two separate translational stages, wherein one is configured to move the temperature-controlled stage or the support structure in the X- and Y-direction (e.g. horizontal plane), while the other is configured to position the dispensing head (e.g. capillary or microcapillary) in the Z-direction (vertical direction).

Alternatively, in an embodiment, the translation stage assembly may be a XYZ stage assembly, that is configured to position the temperature-controlled stage and support structure with respect to the dispensing head (e.g. capillary or microcapillary) in all dimensions (X, Y and Z).

In certain embodiments, the system comprises an adjustment means configured to hold the first adapter with respect to the temperature-controlled stage in an adjustable manner.

In certain embodiments, the adjustment means comprises a holding means, particularly in the form of an electromagnet that is configured to releasably hold the first adapter and particularly to automatically release the first adapter when the sample is positioned on the support structure and particularly comprises a pre-defined temperature.

In certain embodiments, the system comprises an adjustment means configured to hold the first adapter with respect to the temperature-controlled stage in an adjustable manner, wherein the adjustment means comprises a holding means, particularly in the form of an electromagnet, that is configured to releasably hold the first adapter and to automatically release the first adapter when the sample is positioned on the support structure.

In certain embodiments, the transfer mechanism comprises a second adapter, wherein the first and the second adapter are designed to engage with each other when the holding means releases the first adapter.

In certain embodiments, the transfer mechanism is designed to pivot the second adapter above the container when the first adapter is engaged with the second adaptor and released from the holding means.

In certain embodiments, the transfer mechanism comprises a second adapter, wherein the first adapter and the second adapter are designed to engage with each other when the holding means releases the first adapter, and wherein the transfer mechanism is designed to pivot the second adapter above the container when the first adapter is engaged with the second adaptor and released from the holding means.

In certain embodiments, the transfer mechanism comprises a movement generating means, particularly comprising a solenoid, that is configured to move the second adapter downwards when the first adapter and the support structure are positioned above the container in the vertical position, so that the sample on the support structure contacts the cryogen in the container.

In certain embodiments, the dispensing head is formed by a capillary, particularly microcapillary, at an end of the liquid handling system, which capillary comprises a tip for accommodating an aspirated sample.

In particular, an inner diameter of the microcapillary may be within the range from 1 micrometer to 900 micrometers, more particularly within the range from 1 micrometer to 100 micrometers.

In certain embodiments, the system comprises a first reservoir, into which the dispensing head containing a nanoliter volume of a sample can be immersed so as to allow diffusion-controlled sample conditioning.

In certain embodiments, the system comprises a liquid handling system comprising a dispensing head, wherein the liquid handling system is configured to aspirate and dispense a volume of a sample via the dispensing head, wherein the system further comprises a first reservoir, into which the dispensing head containing a nanoliter volume of a sample can be immersed so as to allow diffusion-controlled sample conditioning, e.g. for desalting or exchange of buffer prior to deposition on the support structure.

Diffusion-controlled sample conditioning prior to sample preparation is especially advantageous in combination with controlled sample evaporation, because the salt concentration of the sample increases during evaporation.

In certain embodiments, the system comprises a second reservoir from which the dispensing head containing a nanoliter volume of sample can aspirate a small volume containing cognitive molecules.

In certain embodiments, the light source is adapted to produce light comprising at least light of a first wavelength, particularly in the range between 600 nm and 900 nm, more particularly in the range between 780 nm and 880 nm or in the range between 630 nm and 670, and light of a second wavelength, particularly in the range between 350 nm and 500 nm, more particularly in the range between 405 nm and 450 nm.

For example, the first wavelength may be 780 nm. For example, the second wavelength may be 405 nm, 445 nm, or 450 nm.

In certain embodiments, the distance between the first wavelength and the second wavelength is 300 nm to 400 nm.

In certain embodiments, the system comprises a first light source adapted to produce light of a first wavelength, particularly in the range between 600 nm and 900 nm, more particularly in the range between 780 nm and 880 nm or in the range between 630 nm and 670 nm, and a second light source adapted to produce light of a second wavelength, particularly in the range between 350 nm and 500 nm, more particularly in the range between 405 nm and 450 nm.

In certain embodiments, the system comprises a first photodetector, which is positioned such that light emitted from the first light source and transmitted by the support structure (particularly by the sample on the support structure) can be detected by the first photodetector, and a second photodetector, which is positioned such that light emitted from the second light source and transmitted by the support structure can be detected by the second photodetector.

In certain embodiments, the system comprises a first dichroic mirror, which is adapted to let light of the first wavelength pass and reflect light of the second wavelength, wherein the first dichroic mirror is positioned such that the light emitted by the first light source and the light emitted by the second light source are merged by the first dichroic mirror and directed at the support structure, particularly perpendicular to the surface of the support structure.

In certain embodiments, the system comprises a second dichroic mirror, which is adapted to let light of the first wavelength pass and reflect light of the second wavelength, wherein the second dichroic mirror is positioned such that the light transmitted by the support structure (particularly by the sample on the support structure) is split into a first transmitted light beam and a second transmitted light beam, wherein the first transmitted light beam is directed at the first photodetector and the second light beam is directed at the second photodetector.

In certain embodiments, the system comprises a first light source adapted to produce light of a first wavelength, particularly in the range between 600 nm and 900 nm, more particularly in the range between 780 nm and 880 nm or in the range between 630 nm and 670 nm, a second light source adapted to produce light of a second wavelength, particularly in the range between 350 nm and 500 nm, more particularly in the range between 405 nm and 450 nm, a first photodetector, a second photodetector, a first dichroic mirror, and a second dichroic mirror, wherein the first and the second dichroic mirror are adapted to let light of the first wavelength pass and reflect light of the second wavelength, and wherein the first dichroic mirror is positioned such that the light emitted by the first light source and the light emitted by the second light source are merged by the first dichroic mirror and directed at the support structure, and wherein the second dichroic mirror is positioned such that the light transmitted by the support structure (particularly by the sample on the support structure) is split into a first transmitted light beam and a second transmitted light beam, wherein the first transmitted light beam is directed at the first photodetector and the second light beam is directed at the second photodetector.

Further features and advantages of the invention shall be described by means of a detailed description of an embodiment with reference to the Figures, wherein FIG. 1 shows a perspective view of the cryo-grid preparation system according to the invention;

Figure 1:
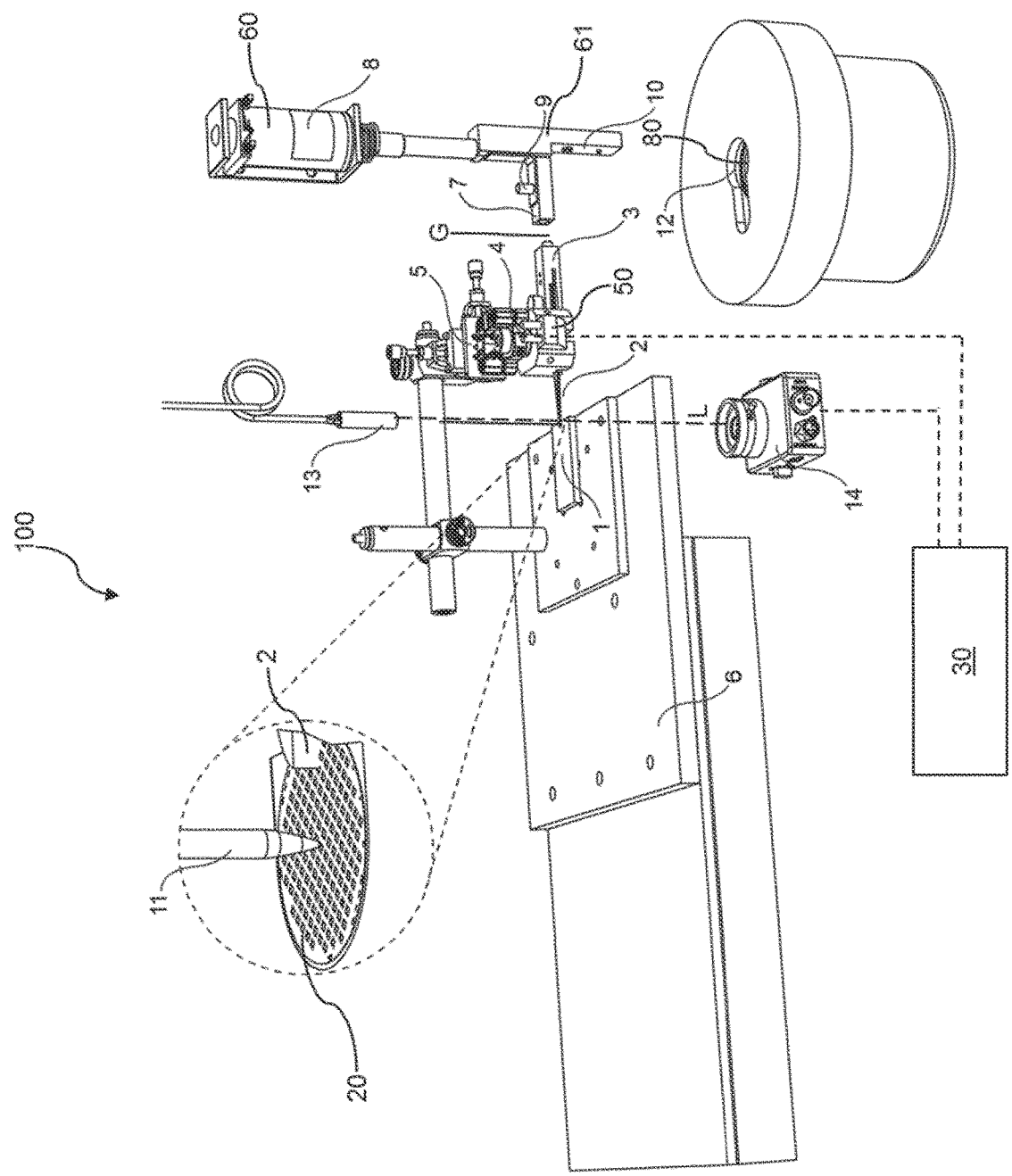

FIG. 1 shows an embodiment of the system 100 according to the invention. The system 100 comprises, apart from the dispensing head 11 formed e.g. by a microcapillary 11 a temperature-controlled stage 1; tweezers 2 holding a support structure 20 (e.g. an EM grid); an electromagnet 4 holding the tweezers 2; an adjustment means 5, e.g. in the form of an xyz manual alignment 5 (also termed 'kinematic stage'), to ensure a flat positioning of the support structure 20 on the temperature-controlled stage 1, wherein said adjustment means 5 is mounted on the temperature-controlled stage 1; a first adapter 3 mounted on the tweezers 2 with a screw to open and close the tweezers 2 of the first adapter 3, separated by a gap G from a second adapter 7 on the transfer mechanism 60 (also denoted as injector assembly). In particular, two attracting permanent magnets, particularly Nd magnets, are inserted into the ends of the adapters 3, 7, a third permanent magnet 9, particularly Nd magnet, is holding the second adapter 7 in a horizontal position.

The system 100 further comprises a light source 13, particularly a laser diode, more particularly a 780 nm infrared laser diode, which is positioned above the temperature-controlled stage 1. The light source 13 is configured to emit a light beam along a light path L, wherein the surface of the support structure 20 intersects with the light path L, such that light from the light source 13 is directed at the support structure. In particular, the light source 13 and the temperature-controlled stage 1 are positioned such that the surface of the support structure 20 is perpendicular to the light path L.

Furthermore, the system 100 comprises a photodetector 14 which is positioned below the temperature controlled-stage 1, in the light path L, such that light traveling through the support structure 20 on the temperature-controlled stage 1, that is transmitted by the support structure 20, is directed at the photodetector 14, wherein an electrical signal is generated by the photodetector 14 dependent on the intensity of the light detected by the photodetector 14. The signal generated by the photodetector 14 is transmitted to a control device 30 of the system 100. The control device 30 is adapted to trigger the transfer mechanism 60 at specified light intensity values in order to move the support structure 20 with the sample into the liquid cryogen 80 thereby generating a vitrified sample. In particular, the transfer mechanism 60 can be triggered by the control device 30 indirectly by deactivating the electromagnet 50 as specified below.

When the support structure 20 is an EM grid with a holey carbon film, the light beam emitted by the light source 13 is partially transmitted through the gaps of the EM grid, which also harbor the thin sample film. In particular, the light intensity of the transmitted light is dependent on absorption by the liquid sample, as well as light scattering and interference phenomena, particularly resulting from reflection at the air/liquid interface. Therefore, in particular, the signal generated at the photodetector 14 depends on the film thickness of the sample film on the support structure 20.

In particular, the signal can be normalized by means of a reference signal measured on a dry support structure 20 before sample deposition in order to correct for different properties of individual support structures 20.

Generally, in all embodiments, the temperature-controlled stage 1 may comprise a water-cooled peltier element controlled by a peltier controller. The peltier controller gets the stage temperature from a temperature sensor mounted on the stage 1. The actual dew point temperature may be delivered by a dew point sensor that measures both ambient temperature and relative humidity inside the experimental chamber and continuously calculates the dew point temperature, which is fed back into the peltier controller via control software.

In the method according to the present invention, the temperature of the support structure 20 is set above the dew point temperature by means of the temperature-controlled stage 1 in order to partially evaporate the sample film in a controlled manner. During evaporation, the film thickness of the sample layer can be monitored by means of the light source 13 and the photodetector 14, such that sample vitrification can be triggered at a specified film thickness.

In the following the function of the transfer mechanism 60 is specified in detail.

The system/transfer mechanism 60 further comprises a solenoid 8 with e.g. 30 mm hub; a secondary electrical circuit 10 that is closed when the tweezers 2 are hitting the switch, which triggers the solenoid 8 and moves the support structure 20 downwards into the cryogen 80 contained in container 12.

The support structure 20 is held by small tweezers 2 of adapter 3. The tweezers 2 are securely mounted in said first adapter 3 by e.g. two screws. An e.g. third screw allows the opening and closing of the tweezers 2 by applying pressure on them. The back end of this first adapter 3 has a permanent magnet, particularly a Neodymium magnet inserted.

The support structure 20, tweezers 2, and first adapter 3 form an assembly. This assembly is held in a horizontal position by a holding means 50 in the form of e.g. said electromagnet 50 that is in contact with the tweezers 2. The electromagnet 50 itself is mounted to said adjustment means 5 that allows manual alignment in all dimensions in order to align the support structure/grid 20 with the temperature-controlled stage 1, where the grid 20 has to lie flat for good thermal contact and effective sample deposition.

A translation stage assembly 6 comprising e.g. a combination of multiple motorized linear stages enables the precise positioning of the microcapillary tip 11 above the support structure's 20 surface on the temperature-controlled stage 1. The dispensing head 11 and surface of the grid 20 are brought in close proximity to transfer the sample from the dispensing head 11 to the support structure (e.g. grid) 20.

Particularly, while the adjustment means 5 is mounted on the temperature controlled stage 1, the dispensing head 11 is not connected to the temperature controlled stage 1 such that the latter can by moved by the stage assembly 6 with respect to the dispensing head 11 which may be held by a suitable holding means not indicated in FIG. 1. Particularly, said microcapillary tip (dispensing head) 11 is mounted on a separate Z-axis stage that allows the adjustment of the vertical position of the microcapillary with respect to the support structure 20. Particularly, the stage assembly 6 allows to automatically move the temperature-controlled stage in the XY plane along which the stage 6 extends.

Said sample transfer can be performed in multiple ways depending on the physical and chemical properties of the sample. (i) Direct deposition and subsequent spreading of a nanoliter volume droplet on the support structure 20 (e.g. EM grid) by surface tension effects. (ii) Deposition of a nanoliter volume droplet on the support structure 20 (e.g. EM grid), followed by re-aspiration of sample with a volume smaller than the initially deposited volume. (iii) Deposition of a nanoliter volume droplet on the support structure 20 (e.g. EM grid), followed by a relative movement between the EM grid and the microcapillary tip 11 while the liquid bridge between the two is still established in order to spread the deposited sample on the support structure 20 (e.g. EM grid). (iv) Deposition of a nanoliter volume droplet on the support structure 20 (e.g. EM grid) in combination with a relative movement of the support structure 20 (e.g. EM grid) and microcapillary tip 11 during deposition in order to spread the deposited sample on the support structure 20.

The transfer mechanism (hand-over mechanism) 60 comprises a second adapter 7 that also has a permanent magnet, particularly Neodymium magnet, inserted on one end, and is connected via a rotating hinge 61 with a large solenoid 6 on the other end. To keep this second adapter 7 in a horizontal position, a third permanent magnet, particularly Neodymium magnet, is placed accordingly. The first and second adapter 3, 7 are separated by a small gap G. The two inserted magnets attract each other, joining of the two however is hindered by the electromagnet 50 holding firmly to the assembly 20, 2, 3 (e.g. the tweezers 2).

After sample deposition, a rapid injection of the support structure (e.g. EM grid) 20 into cryogenic liquid 80, usually ethane or a mixture of ethane/propane (40/60), has to occur at the desired thickness of the sample film on the supporting structure 20. This is performed by turning off the electromagnet 50 by means of a control signal from the control device 30 at a specified light intensity value of the light transmitted by the support structure 20 measured by the photodetector 14.

Turning off the electromagnet 50 enables the two adapters 3, 7 to snap together and form a new, heavier assembly. This new assembly is too heavy to be held in the original position by the third permanent (e.g. Neodymium) magnet. It quickly falls into the vertical position (hinge 61 on the other side of second adapter 7). If it reaches the vertical position, it is held in place by another magnet to prevent it from bouncing back and forth. At the same time, an electrical circuit is closed through the metallic part of the falling assembly (e.g. switch). This triggers a secondary electrical circuit 10 that controls the solenoid controller. As a result, the solenoid 8 is activated and a 30 mm hub is shot downwards, finally injecting the support structure (e.g. EM grid) 20 into the cryogen 80 in the container 12. The whole process from turning on the solenoid 8 until the support structure 20 is shot into the cryogen 80 occurs within one third of a second time and enables the vitrification of the deposited liquid film.

Figure 2:
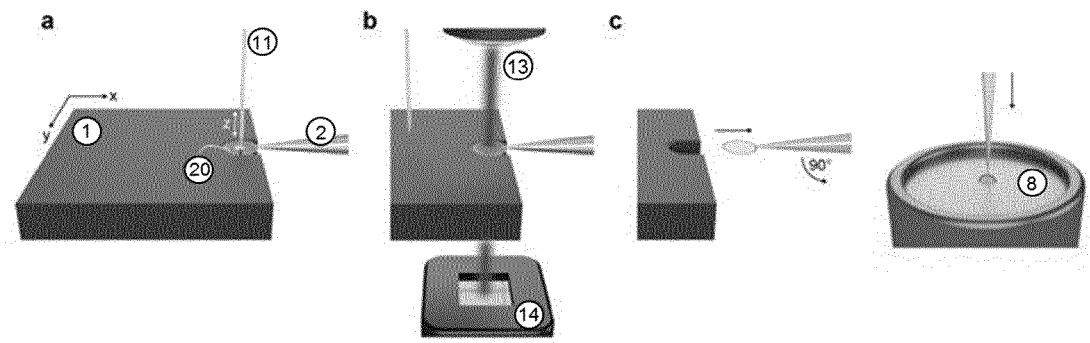
FIG. 2 shows the working principle of the system and method according to the present invention.

FIG. 2 illustrates the working principle of the system and method according to the present invention. As shown in FIG. 2A, a standard holey carbon film EM grid (supporting structure) 20 is mounted between the tips of tweezers 2 and positioned flat (horizontal) in a slot in a temperature-controlled stage 1 (also termed dew point stage). The stage temperature is set close to the dew point temperature and can be regulated using a PID Peltier controller. The EM grid 20 is in good thermal contact with the stage 1. The dew point stage 1 is mounted on a motorized xy axis to move the grid 20 relative to a microcapillary (dispensing head) 11, which can be lowered to a few micrometers above the grid 20. This microcapillary 11 deposits a few nanoliters of sample while the stage 1 is moving in a sinuous pattern, covering an area of about 0.5 mm$^2$.

Figure 8:
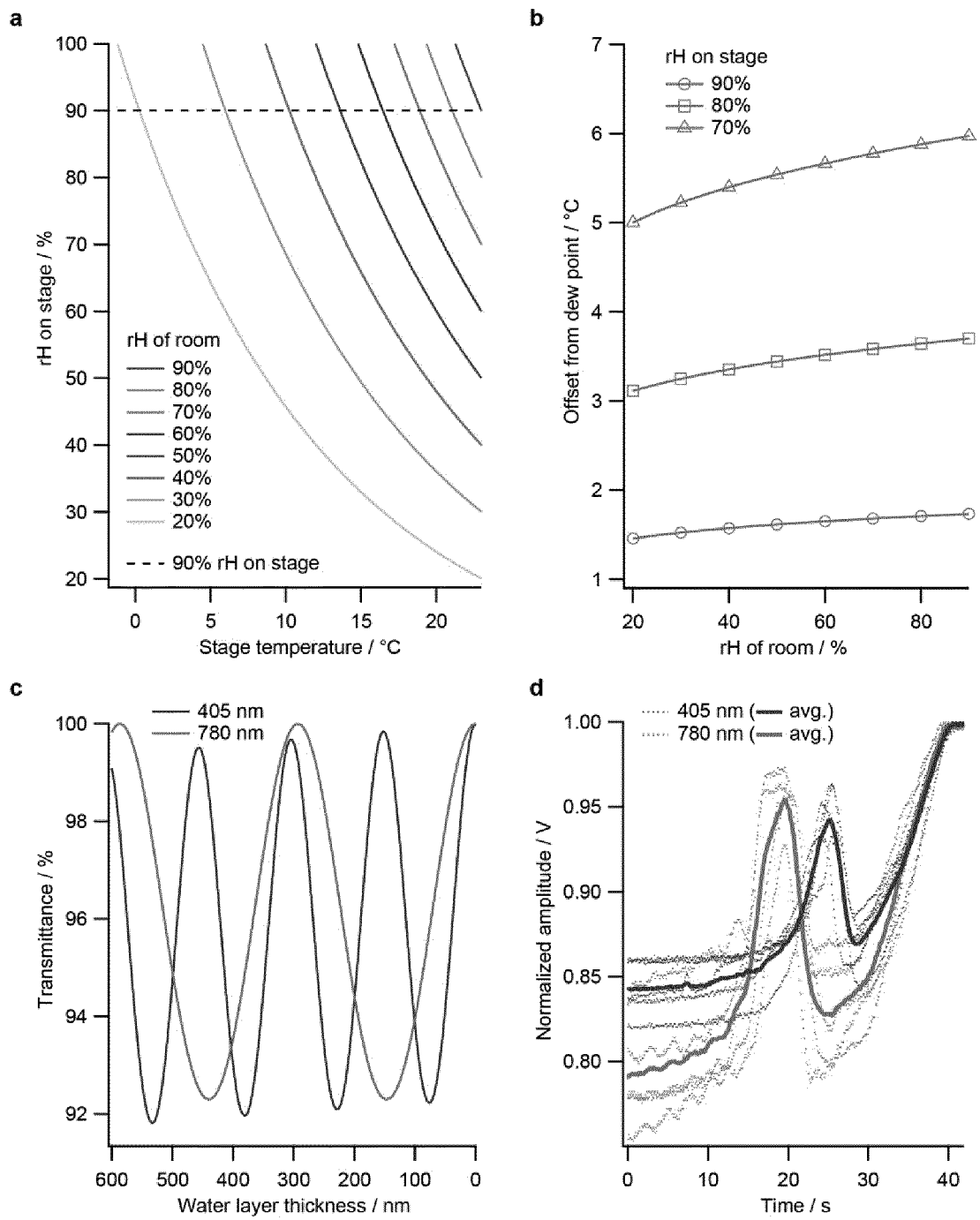
FIG. 8 shows temperature/humidity data of the temperature-controlled stage (dew point-stage)

As shown in FIG. 2B, after sample deposition, the microcapillary 11 is withdrawn and the stage 1 moves to position the grid 20 between an IR laser (light source) 13 ($\lambda$=780 nm) and a photodiode (photodetector) 14. Light scattering and interference effects from the thin aqueous sample film on the grid change as water evaporates (see FIGS. 3 and 8).

As shown in FIG. 2C, a trigger automatically initiates plunge-freezing when the photodiode 14 signal reaches a defined threshold level. The tweezers 2 and grid 20 are rapidly withdrawn from the stage 1, flipped by 90 degrees into the vertical position and plunged into a cryogen 8. This whole pick-and-plunge process takes a few hundred milliseconds.

Figure 3:
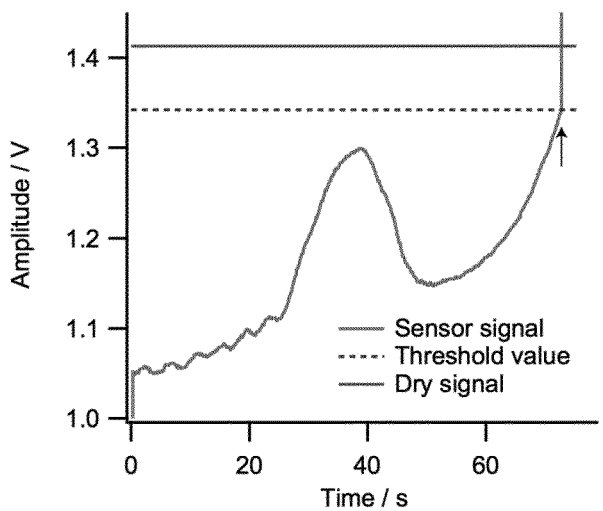
FIG. 3 shows real-time monitoring data of water evaporation from the sample to control the thickness of the vitreous ice layer.

FIG. 3 shows real-time monitoring data of water evaporation from the sample to control the thickness of the vitreous ice layer. The transmitted light of a 780 nm laser is used to register changes in the water-layer thickness (see FIG. 2B). The purple (static) line is the signal obtained with the dry grid (dry signal). The red line is the sensor signal recorded after sample deposition during water evaporation (stage temperature 2° C. above the dew point). Empirically, it was found that useable grids are obtained when the sensor signal is about 95% (blue line) of the dry signal. The pick-and-plunge mechanism is triggered when this threshold is reached (indicated by an arrow), leading to the rapid vitrification of the cryo-grid (within a few hundred milliseconds) and a steep increase of the signal as the grid is removed from the optical laser-path. Note that the plot is showing the characteristic evolution of the signal over time as the sample evaporates. This graph was chosen for clarity, as it shows a large volume (20 nL) evaporating for a long time at a small offset from the dew point (2° C.). In reality, less sample is deposited (or re-aspirated beforehand), and only the last few seconds of the plot can be recorded.

Figure 4:
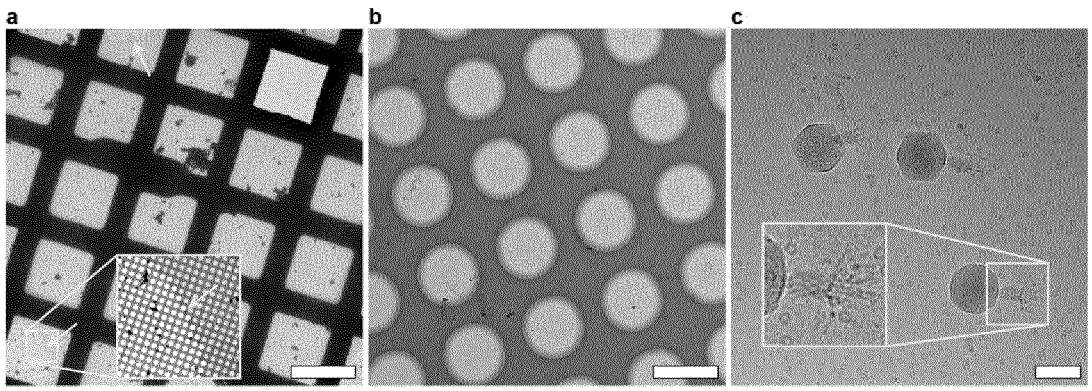
FIG. 4 shows proof-of-concept data for cryo-grid preparation using the system and method according to the invention (deposition protocol 1)

FIG. 4 shows proof-of-concept data for cryo-grid preparation using the system and method according to the invention (deposition protocol 1, see Example below). A total sample volume of 20 nL was applied to a Quantifoil Cu 200 mesh R2/1 grid; excess liquid was re-aspirated to recover as much sample as possible. The dew point stage temperature was 8° C. above the dew point at all times, which resulted in rapid sample thinning; the grid pick-and-plunge mechanism was automatically triggered immediately after re-aspiration of excess sample.

FIG. 4A shows a typical overview of a prepared grid showing a thin film of vitreous ice. Yellow arrows indicate sample borders. Inset: four-fold enlargement of a border region after contrast adjustment to improve visibility. Note the homogenous layer of vitreous sample. Scale bar: 100 µm.

FIG. 4B shows a higher magnification overview image demonstrating the homogeneous sample layer in the holes. Scale bar: 2 µm.

FIG. 4C shows apoferritin particles and bacteriophages in Tris-HCl buffer prepared by this method and imaged at high magnification and defocus to increase contrast. Inset: two-fold enlargement of the indicated region showing a bacteriophage tail and a few ring-shaped apoferritin complexes. Scale bar: 80 nm.

Figure 5:
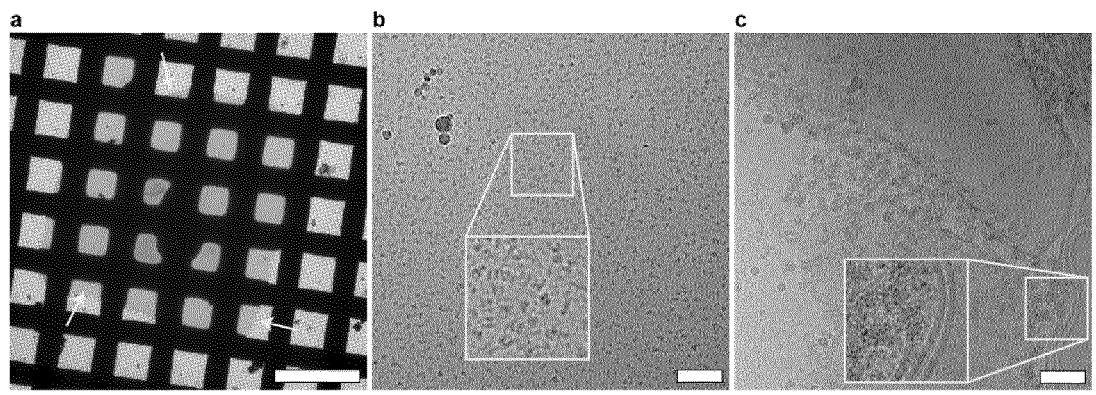
FIG. 5 shows proof-of-concept data for cryo-grid preparation using the system according to the present invention (deposition protocol 2)

FIG. 5 shows proof-of-concept data for cryo-grid preparation using the system according to the present invention and deposition protocol 2 (see Example below). In each case, a 3 nL sample volume was directly applied to the grid; no sample was re-aspirated. The grid was vitrified after sample thinning by controlled water evaporation.

FIG. 5A shows an overview image of a 3 nL sample volume (urease in PBS buffer) in the middle of a Quantifoil Cu 400 mesh R2/2 grid. As for FIG. 4, note that the layer thickness has a gradient in some regions. The periphery of the vitreous ice is indicated by yellow arrows. Scale bar: 100 µm.

FIG. 5B shows an image of a delicate 200 kDa membrane protein reconstituted in amphipols. Inset: two-fold enlargement of the indicated region clearly showing the protein particles. Scale bar: 80 nm.

FIG. 5C shows an example of lossless cryo-grid preparation of the lysate from a single adherent eukaryotic cell. An individual HEK cell growing on a functionalized ITO light microscopy slide was lysed by electroporation and quickly aspirated in a total volume of 3 nL. Subsequently, the lysate was dispensed on the grid using protocol 2 and vitrified. Scale bar: 80 nm.

Figure 6:
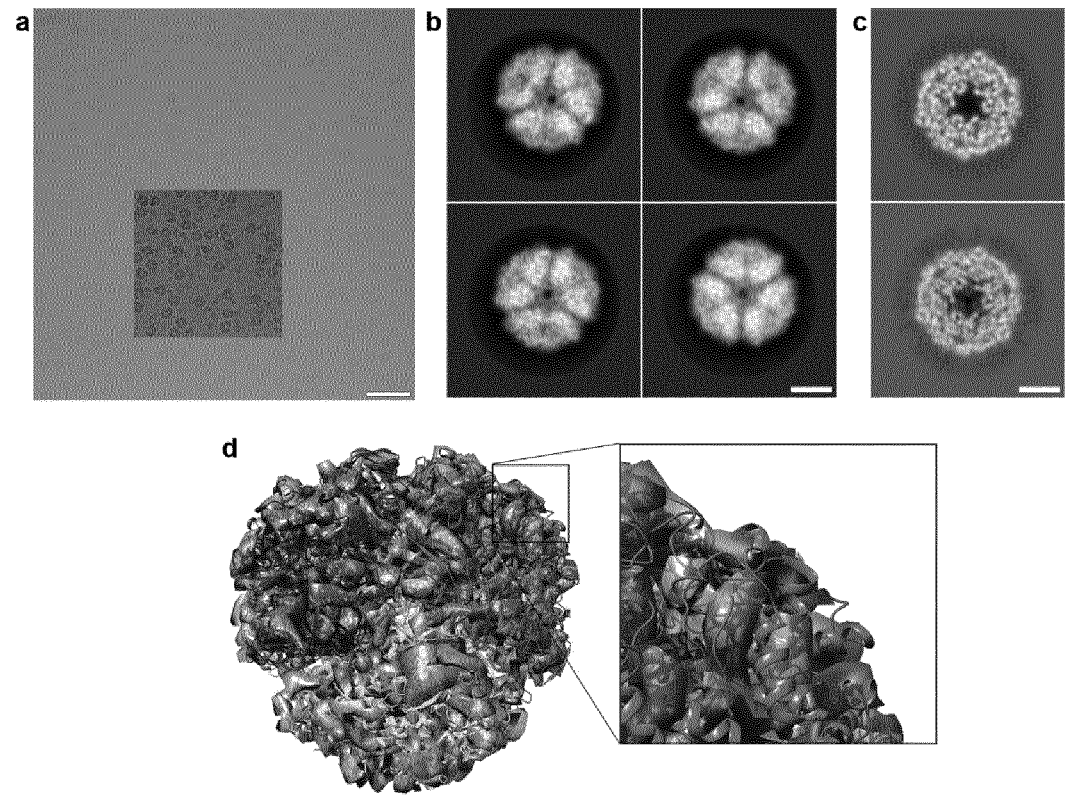
FIG. 6 shows use of the system according to the invention to prepare samples for high-resolution structural analysis.

FIG. 6 shows use of the system according to the invention to prepare samples for high-resolution structural analysis. A 20 nL volume of urease in PBS buffer was deposited on a Quantifoil Cu 200 mesh R1.2/1.3 grid using deposition protocol 1 (see Example below).

FIG. 6A: shows a drift-corrected cryo-EM image of urease particles embedded in vitreous ice. Inset: the particles with increased contrast. Scale bar, 50 nm.

FIG. 6B shows 2D class averages including ~3'400 of the 10,000 particles initially selected. Scale bar, 5 nm.

FIG. 6C shows 3D class averages including ~5'370 of the 8'700 particles identified for further processing. Scale bar, 5 nm.

FIG. 6D shows a urease density map at 5.03 Å resolution, viewed perpendicular to its three-fold axis; the backbone of the fitted X-ray model is shown (DOI: 10.2210/pdb4z42/pdb).

Figure 7:
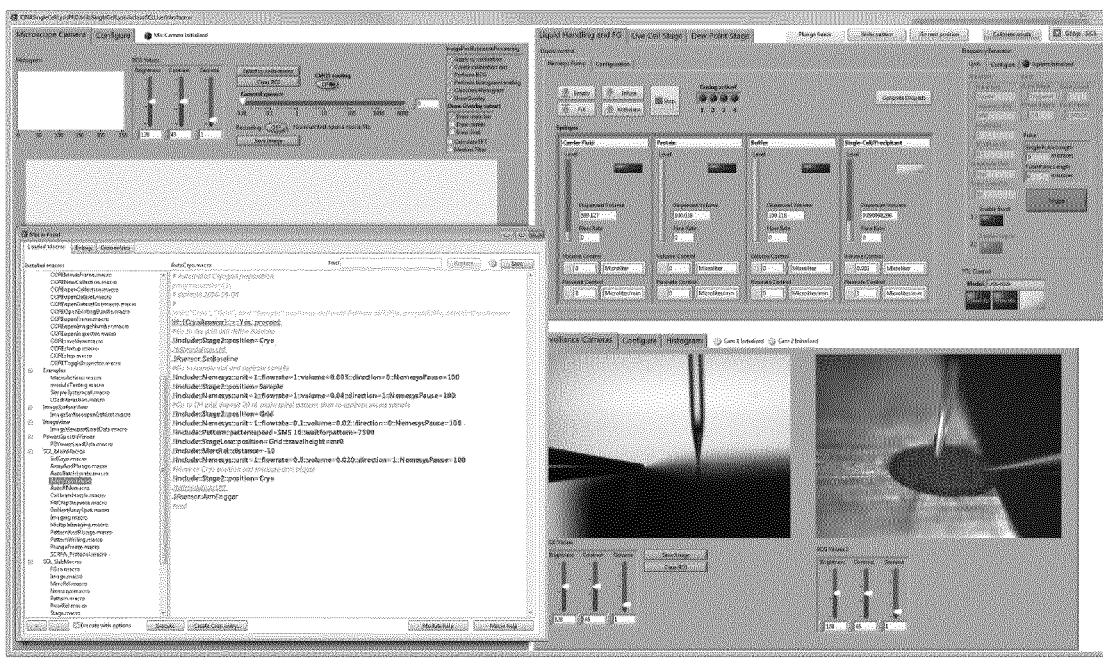
FIG. 7 shows a screenshot of control software.

FIG. 7 shows a screenshot of control software showing the liquid handling control plug-in (top right), surveillance camera views of the microcapillary and the EM grid during sample deposition (bottom right), and the macro panel (left) for automation.

FIG. 8A shows data of the dew point stage (DP-stage) temperature vs. the relative humidity (rH) of the stage/grid microenvironment, plotted for eight different room rHs at a room temperature of 23° C. For small positive offsets from the dew point temperature (e.g., +2° C.), the plots are approximately linear and have similar slopes for all eight scenarios.

FIG. 8B shows the dependence of the offset from the dew point temperature needed to create three different rH microenvironments on the DP-stage vs the rH of the room at 23° C. The offset needed to create a 90% rH microenvironment on the DP-stage varies by less than 0.3 degrees when the room rH changes from 20%-90%.

FIG. 8C shows a simple simulation of the transmittance of ideal coherent blue (405 nm) or infrared (780 nm) laser light incident perpendicular to a layer of water. The transmittance is plotted against the thickness of the water layer (Concise Macleod software, Thin Film Center Inc., USA).

FIG. 8D shows normalized amplitude vs time data for the complete evaporation of a 20 nl water spot deposited on a glow discharged EM grid (Quantifoil Cu 200 mesh, R2/1) measured with an infrared (red line, λ=780 nm) or a blue laser (blue line, λ=405 nm). The grid was kept 3° C. above the dew point. Several independent experiments were carried out (n=5; dotted lines) on different grids for both wavelengths and the average results were calculated (solid lines). Note, that the clarity of the interference pattern suffers (i) due to the bad coherence length of the laser diodes used, (ii) imprecise tilt geometry of the laser relative to the grid, and (iii) the non-uniform film thickness on the illuminated area.

Figure 9:
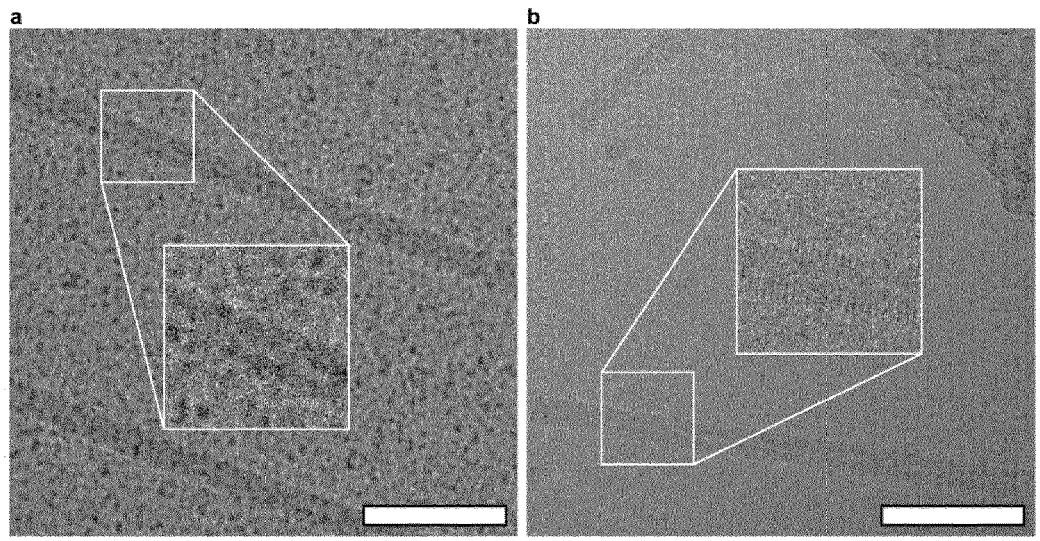
FIG. 9 shows an electron micrograph demonstrating salt effects.

FIG. 9 shows a demonstration of salt effects occurring when too much water evaporates during sample thinning. Tobacco mosaic virus (TMV) samples in PBS containing 0.1% decyl-β-D-maltopyranoside (DM) were prepared for cryo-EM using the system according to the invention and deposition protocol 2 (see Example below).

FIG. 9A shows incorrect sample thinning, too much sample was left on the grid and/or not spread wide enough before thinning. As a result, small salt crystals (high contrast) are visible in the background and the resolution of the repeating structure of TMV is diminished.

FIG. 9B shows Correct sample thinning. The 23 Å repeat of TMV is clearly visible in the raw image and the vitrified ice background has low contrast. Insets in FIG. 9A and FIG. 9B: two-fold enlargement of the indicated region. Scale bars: 80 nm.

Figure 10:
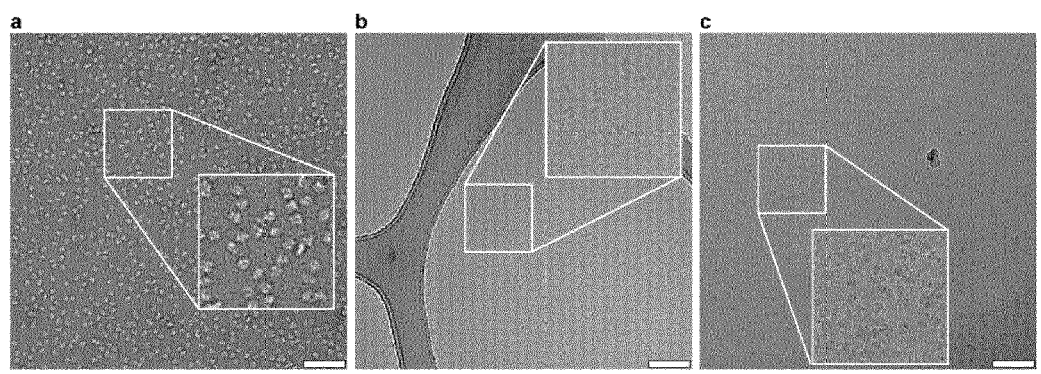
FIG. 10 shows electron micrographs of a 200 kDa membrane protein reconstituted in amphipols.

FIG. 10 shows electron micrographs of a 200 kDa membrane protein reconstituted in amphipols. The sample was prepared for microscopy in different ways. The cryo-EM grids were prepared on the same day. The same sample stock of the reconstituted protein in HEPES buffer complemented with 5 μM sodium azide was used throughout.

FIG. 10A shows an electron micrograph of a negatively stained grid (2% uranyl acetate).

FIG. 10B shows an electron micrograph from a cryo-EM grid prepared using a classic Vitrobot plunge-freezer. The protocol used with the Vitrobot was as follows: 300-mesh Lacey copper grids were glow discharged for 60 s and fed into the Vitrobot for plunge-freezing in liquid ethane: amount of protein sample loaded, 2.5 μL; wait time, 5 s; blotting force, 1; blotting time, 3 s; blotting paper, Whatman #1 qualitative; humidity 100%, chamber equilibrated at 10° C.

FIG. 10C shows an electron micrograph from a cryo-grid (Quantifoil 200 mesh, R2/2) prepared using the device according to the invention (protocol 2, see Example below). 3 nL sample volume. Insets: two-fold enlargement of the indicated regions. Scale bars: 80 nm.

Figure 11:
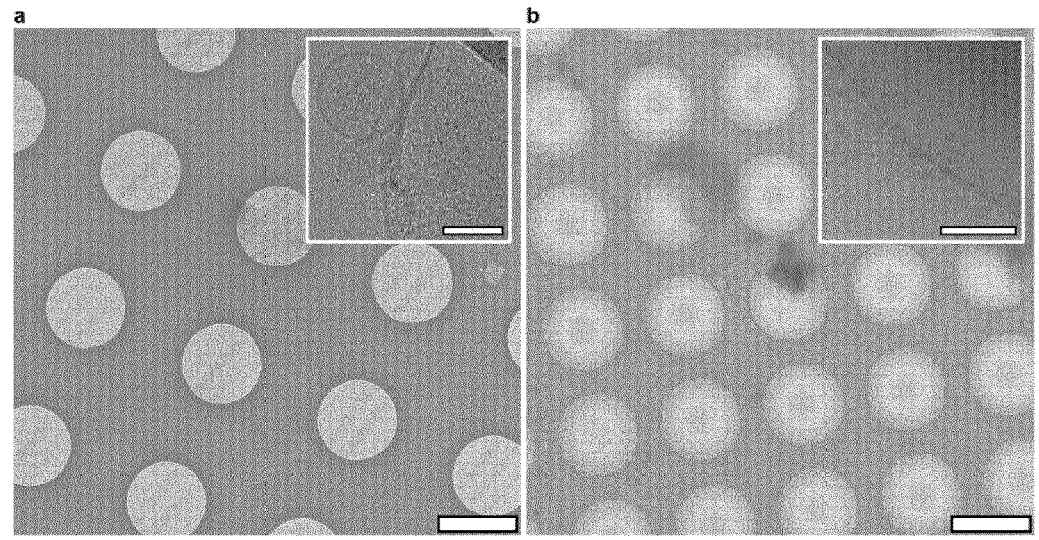
FIG. 11 shows electron micrographs of a single-cell lysate deposited with deposition protocol 2.

FIG. 11 shows electron micrographs of a single-cell lysate deposited with protocol 2 (see Example below).

FIG. 11A shows an electron micrograph from a holey carbon grid with additional layer of continuous carbon (Quantifoil 200 mesh R2/2). Note the slight wrinkles of the continuous carbon layer and the otherwise homogeneous ice layer.

FIG. 11B shows an electron micrograph from a holey carbon grid without continuous carbon film (Quantifoil 200 mesh R2/1). Note the gradients within the holes. Insets show typical membrane patches found in single-cell samples. Scale bars represent 2 μm for overview and 80 nm for insets.

Figure 12:
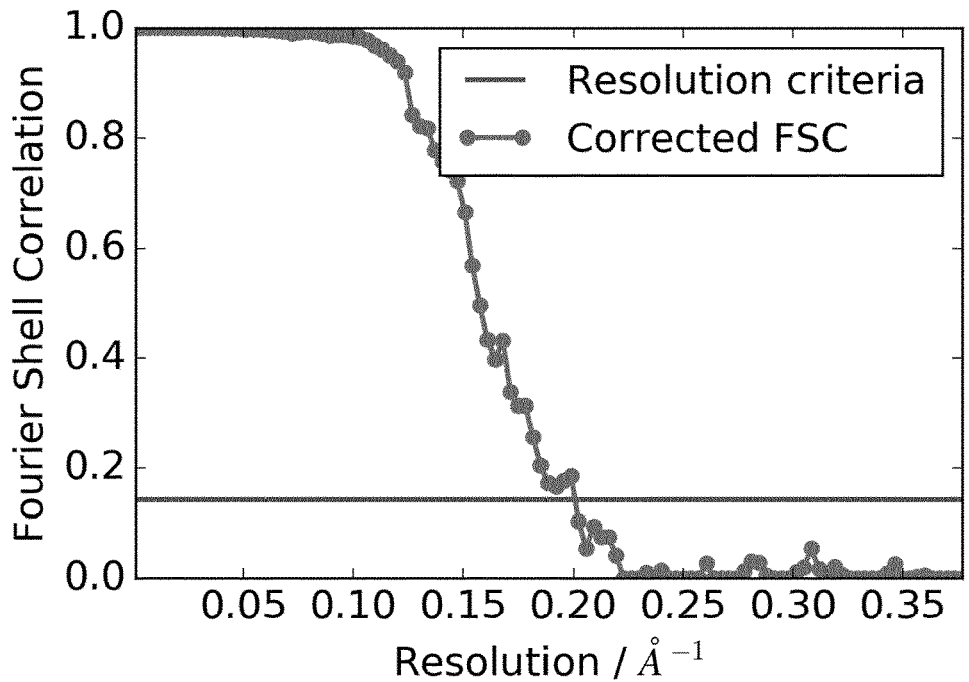
FIG. 12 shows a corrected Fourier Shell Correlation (FSC) curve.

FIG. 12 shows a corrected Fourier Shell Correlation (FSC) curve after the final sharpening of the urease map. According to the "gold-standard" the frequency at which FSC=0.143 indicates the resolution of the 3D reconstruction. Here, the corresponding spatial frequency is 0.199 Å$^{-1}$, giving an estimated resolution of 5.03 Å.

Figure 13:
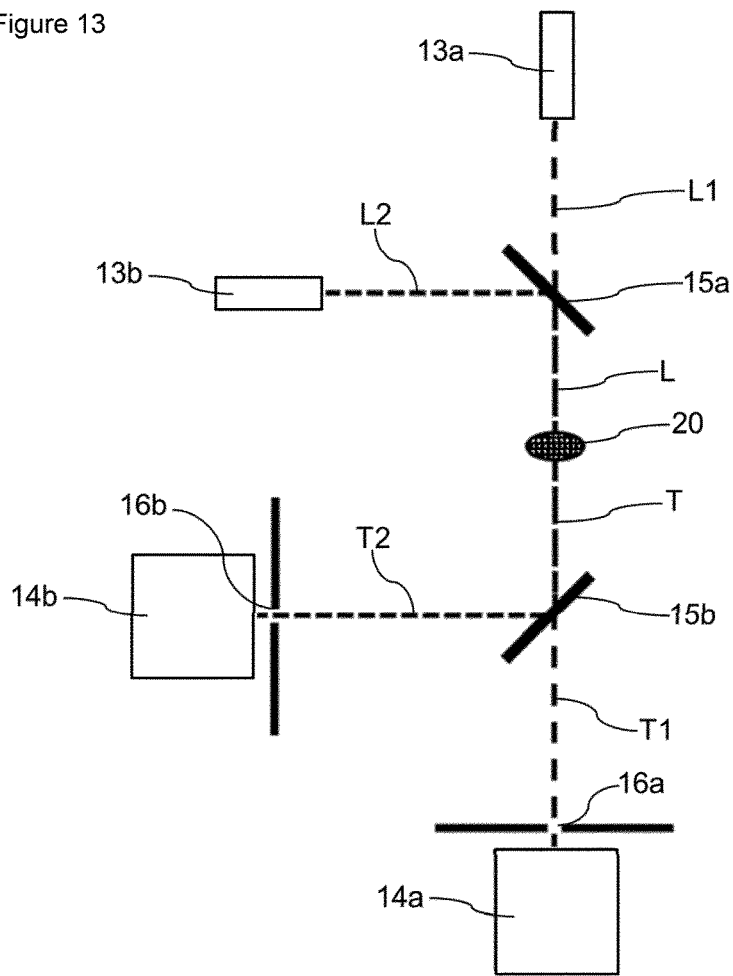
FIG. 13 shows a schematic of a setup for measuring sample film thickness.

FIG. 13 shows a schematic of a setup for measuring sample film thickness, which is a part of a system 100 for preparing a sample on a support structure 20 according to the present invention. The setup comprises a first light source 13a, which is configured to emit a first light beam L1 of a first wavelength along the light path L onto the support structure 20, and a second light source 13b, which is configured to emit a second light beam L2 of a second wavelength perpendicular to the light path L.

In particular, the first and the second wavelength have a distance of 300 nm to 400 nm. For example, the first light beam L1 may comprise light of a wavelength of 780 nm, and the second light beam may comprise light of a wavelength of 405 nm.

The first light beam L1 and the second light beam L2 are directed at a first dichroic mirror 15a, that is configured such that the first light beam L1 passes through the first dichroic mirror 15a and the second light beam L2 is reflected by the first dichroic mirror 15a. The first light beam L1 and the second light beam L2 are merged by means of the first dichroic mirror 15a and directed at the support structure 20, particularly along the light path L, that is perpendicular to the surface of the support structure 20. At least a part of the merged light beam is transmitted by the support structure 20 containing the sample, wherein a transmitted light beam T is generated.

For example, the first light beam L1 may comprise light of a longer wavelength than the second light beam L2, and the first dichroic mirror 15a may be a long pass dichroic mirror (serving as a long pass filter) adapted to let the light of the first light beam L1 pass, wherein the light of the second light beam L2 is not allowed to pass, but reflected by the first dichroic mirror 15a. Alternatively, in case the first light beam L1 comprises light of a shorter wavelength than the second light beam L2, the first dichroic mirror 15a may be a short pass dichroic mirror (serving as a short pass filter).

The setup further comprises a second dichroic mirror 15b, which is adapted to split the transmitted light beam T into a first transmitted light beam T1 and a second transmitted light beam T2. The second dichroic mirror 15b is configured to let the light of the first transmitted light beam T1 pass and to reflect the second transmitted light beam T2, such that the first transmitted light beam T1 is directed at a first photodetector 14a, and the second transmitted light beam T2 is directed at a second photodetector 14b. The first photodetector 14a is protected from incident light by means of a first aperture 16a, and the second photodetector 14b is protected from incident light by means of a second aperture 16b.

Similar to the first dichroic mirror 15a, the second dichroic mirror 15b may be a long pass dichroic mirror or a short pass dichroic mirror.

The first and the second photodetector 14a,14b are adapted to generate a signal which depends on the intensity of the detected light (of the first or second transmitted light beam T1,T2, respectively). When the first and the second light beam L1,L2 comprise light of separate wavelengths, the thickness of the sample film on the support structure 20 may be determined by means of the two signals generated by the first and the second photodetector 14a, 14b.

The invention is further described by the following example.

EXAMPLE—BLOTTING-FREE AND LOSSLESS CRYO-ELECTRON MICROSCOPY GRID PREPARATION FROM NANOLITER-SIZED PROTEIN SAMPLES AND SINGLE CELL EXTRACTS

Material and Methods

The instrument presented here is described in this specification or was previously published (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988; Kemmerling, S., Arnold, S. A., Bircher, B. A., Sauter, N., Escobedo, C., Dernick, G., Hierlemann, A., Stahlberg, H., Braun, T., 2013. Single-cell lysis for visual analysis by electron microscopy. J. Struct. Biol. 183, 467-473). FIG. 1 provides a detailed description of the setup, including a parts lists and details of the method. FIG. 7 shows the control software.

Chemicals and Buffers

All chemicals were ordered from Sigma-Aldrich, Switzerland if not otherwise indicated. The following buffers were used: PBS, Dulbecco's Phosphate Buffered Saline, 2.7 mM KCl, 1.5 mM $KH_2PO_4$, 136.9 mM NaCl, 8.9 mM $Na_2HPO_4·7H_2O$, pH 7.4; Tris-HCl buffer, 20 mM Tris-HCl, 50 mM NaCl (pH 7.4); HEPES buffer, 10 mM HEPES pH 8.0, 50 mM KCl.

Test Samples

The test samples were (i) Tobacco Mosaic Virus (TMV) in PBS containing 0.1% decyl-β-D-maltopyranoside (DM, Anatrace), (ii) a mixture containing apoferritin and phages against *Escherichia coli* (vB_EcoM_CBA120) in Tris-HCl buffer, and (iii) a purified 200 kDa membrane protein (name not disclosed) reconstituted in amphipols. In this case, the bulk membrane protein sample was applied to a S200 10/300GL size exclusion chromatography column equilibrated with HEPES buffer complemented with 5 μM sodium azide. A single 300 μl fraction corresponding to the center of the major A280 peak was used to prepare cryo-grids by using the cryoWriter and by using a Vitrobot plunge-freezer (FEI). The protein concentration of this fraction was 0.35 mg/mL as determined by absorbance measurement using an UV-Vis Spectrophotometer (Nanodrop 2000, Thermo Fisher Scientific Inc.) and assuming Abs(0.1%)=1. (iv) Urease from *Yersinia enterocolitica* bacteria at a concentration of 0.35 mg/ml in PBS buffer.

EM Grids

Various EM grids were used with the CryoWriter, such as 200 mesh copper grids with holey carbon film (R2/2, R2/1, and R1.211.3, Quantifoil, Germany), as well as holey carbon grids with an additional layer of continuous carbon, and lacey carbon grids. EM grids were glow discharged for 30 s in air plasma immediately before use. Note that the flatness of the grid is an important aspect, both for the mechanical writing step and for efficient heat-transfer when the grid is on the temperature controlled dew point stage (DP-stage).

Cryo-Grid Preparation

The two deposition protocols used with the cryoWriter setup are detailed in the sections below and in FIG. 1.

Electron Microscopy and Single Particle Analysis

Unless otherwise specified, the EM grids with test samples were placed in a Gatan-626 cryo-holder and imaged in a Philips CM200 (FEG) TEM operated at 200 kV and equipped with a TVIPS F416 4 k CMOS camera (TVIPS, Germany).

Images of urease for single particle analysis were acquired using a FEI Titan Krios, operated at 300 kV and equipped with Gatan Quantum-LS (zero-loss slit width of 20 eV) and Gatan K2 Summit DED. Low dose conditions were applied with a total electron dose of ~50 $e^-/A^2$ at a dose rate of 5-6 eJphysical-pixel/sec for a stack of 40 images obtained in movie mode. Drift- and contrast transfer function (CTF-) correction was applied to the urease data with the Zorro software (McLeod, R. A., Kowal, J., Ringler, P., Stahlberg, H. submitted 2016. Robust image alignment for cryogenic transmission electron microscopy) using CTFFIND4 (Rohou, A., Grigorieff, N., 2015. CTFFIND4: Fast and accurate defocus estimation from electron micrographs. J. Struct. Biol. 192, 216-221). Approximately 10'000 particles were manually selected from the 51 micrographs recorded using EMAN2 (Tang, G., Peng, L., Baldwin, P. R., Mann, D. S., Jiang, W., Rees, I., Ludtke, S. J., 2007. EMAN2: An extensible image processing suite for electron microscopy. J. Struct. Biol. 157, 38-46), and subsequently processed in RELION-1.4 (Scheres, S. H., 2012. RELION: implementation of a Bayesian approach to cryo-EM structure determination. J. Struct. Biol. 180, 519-530). After particle alignment, around 8'700 particles yielded good 2D class averages that were subsequently used for the 3D classification. The two best 3D classes were selected (containing ~7'800 particles) and iteratively refined. A final sharpening of the map was then performed, yielding the final 3D reconstruction of the urease complex. The atomic model (PDB: 10.2210/pdb4z42/pdb) was fitted into the 3D map using the UCSF chimera software (Pettersen, E. F., Goddard, T. D., Huang, C. C., Couch, G. S., Greenblatt, D. M., Meng, E. C., Ferrin, T. E., 2004. UCSF Chimera—a visualization system for exploratory research and analysis. J. Comput. Chem. 25, 1605-1612).

Results

Principles and Setup

The cryoWriter (System according to the invention) setup and the principles of the method are depicted in FIG. 2 further details can be found in FIGS. 1 an 7. The cryoWriter is integrated into a liquid handling and transfer system developed previously for nanoliter-volume sample conditioning and EM grid preparation for negative stain and trehalose embedding (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988). The method uses a high-precision pipetting system to control liquid uptake and dispensing by a microcapillary, a temperature-controlled dew point stage (DP-stage) to control the environment of the EM grid, a real-time monitoring system to control the thickness of the sample layer, and a pick-and-plunge-mechanism for sample vitrification. The setup itself is not contained in a humidity-controlled environment. The entire process is controlled by an openBEB (Ramakrishnan, C., Bieri, A., Sauter, N., Roizard, S., Ringler, P., Müller, S. a., Goldie, K. N., Enimanev, K., Stahlberg, H., Rinn, B., Braun, T., 2014. openBEB: open) plug-in developed in LabVIEW (Elliott, C., Vijayakumar, V., Zink, W., Hansen, R., 2007. National Instruments LabVIEW: A Programming Environment for Laboratory Automation and Measurement. JALA 12, 17-24), and can be automated using macros (see FIG. 7).

The setup for cryo-grid preparation and the basic procedure (FIG. 2) are as follows:

(i) Grid cooling: a glow-discharged standard holey carbon film TEM grid held by tweezers is positioned on the cold DP-stage. (ii) Sample up-take; a microcapillary and high-precision pump system are used to aspirate a liquid plug from a sample stock or the lysate of a single cell immediately after electro-lysis, as described previously (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988; Kemmerling, S., Arnold, S. A., Bircher, B. A., Sauter, N., Escobedo, C., Dernick, G., Hierlemann, A., Stahlberg, H., Braun, T., 2013. Single-cell lysis for visual analysis by electron microscopy. J. Struct. Biol. 183, 467-473).

(iii) Sample deposition (FIG. 2A), the microcapillary tip is brought into close proximity of the grid surface. The sample is then dispensed from the microcapillary to form a small liquid droplet that spans the gap between the microcapillary tip and the hydrophilic (glow-discharged) holey-carbon surface of the EM grid. Simultaneously, the grid is moved relative to the nozzle in a sinusoidal or circular pattern; the liquid sample is spread-out onto the surface filling the holes of the carbon film. (iv) Sample stabilization and thinning by controlled water evaporation (FIG. 2B and dedicated section below); the temperature of the DP-stage is set to keep both the EM grid and the suspended sample at a specified temperature close to the dew-point temperature of the room, throughout. Note that the grid is not immediately vitrified, but can be kept on the stage for a short time (between <1 and 10 s, depending on the chosen offset temperature), so that a certain amount of sample water can evaporate. Interference/scattering effects from interaction of the grid and applied aqueous sample with a 780 nm laser beam can be used to monitor the evaporation (FIG. 3). The controlled loss of some water is important to ensure that a thin water film spans the holes of the carbon layer. (iv) Cryo-grid pick-and-plunge freezing (FIG. 2C); the mechanism is triggered by the monitoring system or after a pre-set time, rapidly plunging the grid (and tweezer tips) into a liquid ethane/propane (40:60) bath (Tivol, W. F., Briegel, A., Jensen, G. J., 2008. An improved cryogen for plunge freezing. Microsc. Microanal. 14, 375-379) for vitrification (see also FIG. 1).

Two deposition protocols can be used with this basic procedure, depending on the experiment and sample. In Protocol 1, a relatively large volume (20 nL) is deposited on the grid, excess sample is removed and recovered by re-aspiration with the dispensing microcapillary; this protocol is ideal for the preparation of large EM imaging areas of purified protein complexes for single-particle analysis and high-resolution structural determination. In Protocol 2, a volume of ~3 nL of sample is directly deposited on the grid, avoiding the need for a re-aspiration step. This protocol is better suited for applications that are restricted to minute volumes, e.g., single-cell visual proteomics (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988; Engel, A., 2010. Assessing Biological Samples with Scanning Probes, p. 417-431, Springer Berlin Heidelberg; Kemmerling, S., Ziegler, J., Schweighauser, G., Arnold, S. A., Giss, D., Muller, S. A., Ringler, P., Goldie, K. N., Goedecke, N., Hierlemann, A., Stahlberg, H., Engel, A., Braun, T., 2012. Connecting µ-fluidics to electron microscopy. J. Struct. Biol. 177, 128-134).

These protocols are described in detail below:

Protocol 1: Deposition with Recovery of Excess Sample

The microcapillary and the high-precision pump system are used to aspirate a few tens of nanoliters from a sample stock. The microcapillary tip is then lowered to the glow-discharged grid surface (separation ~10 µm) and a 20 nL drop of sample is dispensed from it. The drop spans the gap between the microcapillary tip and the EM grid and can be spread further to cover an area of ~0.5 $mm^2$ by moving the grid relative to the microcapillary (FIG. 2A). Subsequently, the microcapillary tip is lowered to touch the grid surface within this area and re-aspirate as much excess sample as possible, recovering this for future use. The temperature of the DP-stage (and the grid) is kept above the dew-point temperature of the room for all of these steps, to allow a minimal amount of water to evaporate. A temperature offset from the dew point by +8° C., combined with immediate plunge-freezing after re-aspiration of excess sample, typically results in a good sample thickness for high-resolution structural analysis. If more precision is required, the thickness of the sample film can be optimized by controlled water evaporation using the real-time monitoring system described below. A more extensive discussion of the sample thinning process can be found in the dedicated section.

Protocol 2: Direct Sample Deposition without Re-Aspiration

With this protocol, ~3 nL of sample are directly deposited onto the grid, avoiding the re-aspiration of sample. The grid temperature is kept at the dew point to avoid water evaporation, and the tiny sample droplet is spread by moving the EM grid underneath the microcapillary tip in a sinusoidal or circular pattern covering an area of approx. 0.5 $mm^2$. Subsequently, a sample-thinning step must be performed by controlled water evaporation before plunge-freezing. Evaporation is induced by increasing the DP-stage temperature to a value slightly above the dew point of the room (e.g., +2° C.). To obtain reproducible results with these small volumes, the sample thinning process must be supervised by the monitoring system (see dedicated section).

Sample Stabilization and Thinning by Controlled Water Evaporation

Due to surface tension effects, even extremely small sample aliquots must be thinned for the grids to be usable for cryo-EM. Recently, an interesting method was demonstrated using "self-blotting" grids in combination with ink-jet spotting (Razinkov, I., Dandey, V. P., Wei, H., Zhang, Z., Melnekoff, D., Rice, W. J., Wigge, C., Potter, C. S., Carragher, B., 2016. A new method for vitrifying samples for cryoEM. J. Struct. Biol. 195, 190-198).

Here, we propose a method based on the controlled evaporation of sample water to create thin sample layers. Sample film thickness can be tuned by adjusting the temperature of the DP-stage and the time span before pick-and-plunge-freezing is initiated. The sample is slightly concentrated by water evaporation. This might be desirable for the protein, but salt concentrations also increase, which can potentially harm protein complexes. Thus, thinning in this way is limited to sample films that are already thin, making the re-aspiration of samples prepared by deposition protocol 1 essential. Note that, if necessary, the liquid handling and transfer system supporting the cryoWriter would allow sample conditioning, e.g., salt exchange by a diffusion driven process (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988) before cryo-grid preparation.

The cryoWriter setup includes a laser diode (780 nm; FIG. 2B) and a photodetector to follow the evaporation of sample liquid from the grid in real-time. At 780 nm wavelength, light is not significantly absorbed by water or biological material, making the amount of transferred heat into the sample negligible (Bircher, B. A., Lang, H.-P., Duempelmann, L., Gerber, C., Braun, T., 2013. Photothermal excitation of microcantilevers in liquid: effect of the excitation laser position on temperature and vibrational amplitude. Micro Nano Lett. 8, 770-774). Nevertheless, changes in water film thickness due to evaporation has a detectible effect on the amplitude of the signal recorded by the photodetector. Besides changes in light scattering, the transmitted light signal is also affected by interferences between light waves reflected at the surfaces of the thin film (FIG. 3). As water evaporates, the signal increases approximately linearly, until a specific layer thickness is reached where it starts to increase sharply. We attribute this positive peak to constructive interference of the almost perpendicular beam at the layer thickness, $d \approx \lambda/(2n)$, for wavelength $\lambda=780$ nm and $n_{780}=1.329$ (Hale, G. M., Querry, M. R., 1973. Optical Constants of Water in the 200-nm to 200-µm Wavelength Region. Appl. Opt. 12, 555-563). A negative peak follows directly the positive peak as expected from destructive interference. A laser diode with an emission peak at around 405 nm instead of at 780 nm was used to verify that the observed signal behavior (FIG. 3) was primarily due to interference effects. Once a specific user-defined threshold of the signal relative to the absolute signal obtained with the dry grid (see FIG. 3 for an explanation) is reached, the pick-and-plunge mechanism is triggered by the monitoring system, whereby the cryo-grid is rapidly vitrified.

Note that the "dry signal" depends on the grid type and mesh size. As the difference is significant, a "blank" measurement always needs to be made before sample deposition (FIG. 3). By contrast, the signal does not depend on the type of sample deposited on a specific grid type/mesh, making it possible to perform screening runs using buffer alone (without sample) to determine the ideal freezing conditions for the experiment.

Proof of Concept Cryo-Grid Preparation from Different Samples

The examples in this and the following section show that the cryoWriter setup can be used to prepare high-quality cryo-grids of different biological samples (e.g., soluble or membrane protein particles, filamentous assemblies, viruses, cell lysate) for various purposes, such as structure determination by single particle analysis (demonstrated below) or helical analysis, and single-cell visual proteomics (Engel, A., 2010. Assessing Biological Samples with Scanning Probes, p. 417-431, Springer Berlin Heidelberg). In practice, the choice of the deposition protocol used for a specific sample depends on its properties and the aim of the experiment. The method is not sensitive to the buffer system employed.

The use of the cryoWriter and deposition protocol 1 to spread a 20 nL sample volume on a glow-discharged holey carbon film is demonstrated in FIG. 4. For all preparation steps, the DP-stage temperature was kept 8° C. above the dew point. Subsequently, excess sample was re-aspirated and sample-thinning was performed for 1 s before plunge-freezing. As documented by FIG. 4A, the sample that remained after re-aspiration formed a homogeneous vitreous ice layer covering a part of the cryo-grid; the periphery of the region is visible and indicated by arrows. The homogeneity of the layer is confirmed by FIG. 4B, which shows the holey carbon film at higher magnification to demonstrate that the sample layer spans the holes of the carbon support. FIG. 4C shows the high quality of the apoferritin particles (ring-like appearance) and bacteriophages prepared by this method. The architecture of the bacteriophage tail is revealed (inset). Note the absence of crystalline ice structures, indicating that the grid is indeed vitrified. Further examples are shown in the single particle processing section.

The use of the cryoWriter and deposition protocol 2 to distribute 3 nL of sample onto a glow-discharged holey carbon film is demonstrated in FIG. 5. Sample thinning was performed by monitored water evaporation as detailed in the dedicated section above. FIG. 5A shows an overview of a typical grid. The area covered by the vitreous sample is generally smaller than the area covered when deposition protocol 1 is used. Furthermore, the thickness of the vitrified sample-layer is not as homogenous (compare FIG. 5A and FIGS. 4A and B); although the patterned liquid regions deposited by protocol 2 spread out on the hydrophilic grid, a thickness gradient remains due to the surface tension and since water evaporates faster at the periphery of the wet areas. The lower evaporation rate in the center of the sample area is likely a consequence of the larger surface/volume ratio at the droplet periphery, a transiently higher humidity above the grid due to evaporated water and a cooling effect of the evaporation process being less efficiently compensated by the heat-flow from the grid in the droplet center.

The thickness gradients observed when protocol 2 is applied to holey carbon films are a drawback. They could for some samples be minimized by using traces of surfactants or, to a lesser extend, using EM grids covered with thin continuous carbon films. Nevertheless, cryo-EM can be performed on the samples with slightly uneven ice thickness, as demonstrated by FIGS. 5B and C. An image of a 200 kDa membrane protein stabilized with amphipols recorded from a holey carbon cryo-grid prepared using the cryoWriter and protocol 2 is shown in FIG. 5B. Images of the same protein prepared on thin carbon film for negative-stain TEM and on lacey and holey carbon for cryo-EM using either a Vitrobot plunge-freezer or the cryoWriter, are shown in FIG. 10. Whereas the negative stain image shows intact single particles, degraded particles are found regularly on the grid prepared for cryo-EM by the classic plunge-freezing approach, potentially due to the blotting step. By contrast, the cryo-EM grid prepared with the cryoWriter seems to be have more homogeneous protein particles at higher concentration than when prepared using the classic plunge-freezing approach.

The minute volume consumed when deposition protocol 2 is used, allows cryo-grid preparation from samples that are otherwise inaccessible. For example, the lysate of a single eukaryotic cell can be examined. To demonstrate this, adherent HEK 293 cells were cultured on conducting glass slides and an individual target cell was identified in a light-microscope, electroporated and aspirated using a microcapillary as described previously (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988; Kemmerling, S., Arnold, S. A., Bircher, B. A., Sauter, N., Escobedo, C., Dernick, G., Hierlemann, A., Stahlberg, H., Braun, T., 2013. Single-cell lysis for visual analysis by electron microscopy. J. Struct. Biol. 183, 467-473). The same platinum-coated microcapillary was used for electroporation, cell lysate aspiration and dispensing, thus minimizing the exposure of the tiny amounts of biological material to surfaces and the resulting loss of cellular components. Lysate deposition using protocol 2 gave high-quality cryo-grids as shown by FIG. 5C and typical membrane structures with associated proteins are visible. More examples of single cell lysate prepared using sample deposition protocol 2 are shown in FIG. 11

Single Particle Analysis

In order to demonstrate the usefulness of the cryoWriter method for high-resolution structural analysis, urease from *Yersinia enterocolitica* bacteria was prepared for cryo-EM using deposition protocol 1, and imaged with a Titan Krios microscope equipped with a direct electron detector (see Materials and Methods). FIG. 6A documents the high quality of the sample grid. Class averages selected from an initial 2D classification are shown in FIG. 6B. Subsets of particles were selected from the classes generated and used in the final processing steps (FIG. 6C). Refinement according to the "gold-standard" (Henderson, R., Sali, A., Baker, M. L., Carragher, B., Devkota, B., Downing, K. H., Egelman, E. H., Feng, Z., Frank, J., Grigorieff, N., Jiang, W., Ludtke, S. J., Medalia, O., Penczek, P. A., Rosenthal, P. B., Rossmann, M. G., Schmid, M. F., Schroder, G. F., Steven, A. C., Stokes, D. L., Westbrook, J. D., Wriggers, W., Yang, H., Young, J., Berman, H. M., Chiu, W., Kleywegt, G. J., Lawson, C. L. 2012. Outcome of the first electron microscopy validation task force meeting., pp. 205-214 Structure (London, England: 1993), Vol. 20; Scheres, S. H. W., Chen, S., 2012. Prevention of overfitting in cryo-EM structure determination. Nat. Methods 9, 853-854) yielded a 3D reconstruction of the tetrameric complex at a resolution of 5.03 Å according to the Fourier shell correlation (FSC=0.143, FIG. 12).

Discussion

This invention solves the problem of improving sample-grid preparation methods for cryo-EM and preparing such grids using minimal amounts of sample (nanoliters). The cryo-EM sample deposition and vitrification tool described here consumes only 3 to 20 nL of sample per grid and can be used together with different types of sample; e.g., single particle preparations of soluble and membrane proteins, viruses and bacteriophages, or whole cell lysate. The setup includes a monitoring system to allow the controlled thinning of sample films and the automatic activation of the pick-and-plunge mechanism, once a defined threshold is reached. Importantly, freezing conditions and this threshold can be determined using grids prepared with buffer alone instead of the actual sample.

Other important aspects are that the cryoWriter method works with minimal sample loss and does not involve any paper blotting steps. The experience of many laboratories relying on cryo-grid preparations shows that classic preparation methods can be detrimental to the preservation of delicate protein complexes. This is often attributed to either the paper blotting step, which can rapidly change the buffer characteristics of the sample (salt, pH changes, ions leached from the filter paper), can lead to shear forces disturbing long protein assemblies (Lee, J., Saha, A., Pancera, S. M., Kempter, A., Rieger, J., Bose, A., Tripathi, A., 2012. Shear free and blotless cryo-TEM imaging: a new method for probing early evolution of nanostructures. Langmuir 28, 4043-4046), or to the large surface to volume ratio of the sample film after blotting, which exposes more protein to a harsh air-water interface during and after blotting. The sample deposition protocols presented here avoid paper blotting entirely. Deposition protocol 1 also minimizes the exposure time to the air-water interface of the protein remaining on the grid after sample re-aspiration; if the DP-stage offset is +8° C., samples can be vitrified immediately after deposition. The exposure to the air-water interface is longer when deposition protocol 2 is used. Sample deposition, spreading, and thinning can take up to 10 s before the grid ends up in the cryogen. Both deposition protocols also allow the use of additives such as traces of detergent that concentrate at the air-water interface, which might protect proteins from surface effects. Sample conditioning by a diffusion driven process (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988) can be included in the cryoWriter setup, allowing detergent to be rapidly introduced to small sample volumes (<5 nL) and the preparation of homogeneous grids by protocol 2 (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988).

The method promises to significantly shorten the time and effort required to determine suitable freezing conditions. The nearly lossless preparation and low sample consumption achieved, will make cryo-EM applicable to the structural analysis of sparsely available proteins/protein complexes and the content of single cells. This is of particular interest because technical advances in cryo-EM now allow resolutions between 3 and 6 Å to be reached by single particle imaging and analysis of only a few thousand to a few million protein complexes (Liao, M., Cao, E., Julius, D., Cheng, Y., 2013. Structure of the TRPV1 ion channel determined by electron cryo-microscopy. Nature 504, 107-112), making microfluidic sample preparation methods for structural analysis feasible (Giss, D., Kemmerling, S., Dandey, V., Stahlberg, H., Braun, T., 2014. Exploring the interactome:

Microfluidic isolation of proteins and interacting partners for quantitative analysis by electron microscopy. Anal. Chem. 86, 4680-4687).

CryoWriter: Detailed Setup Description and Sample Vitrification

The CryoWriter setup is illustrated in FIG. 1. It has a temperature-controlled stage 1 that is maintained close to the dew point (DP-stage). A combined temperature and humidity sensor (UFT75-AT, Sensor-Tec, Germany) continuously determines the dew point of the room, and a water-cooled Peltier element regulated by a Peltier controller (Cooltronic GmbH, Switzerland) is used to adjust the temperature of the DP stage 1 accordingly. The electron microscopy (EM) grid 20 (previously glow-discharged for 30 sec in air plasma), is held by tweezers 2 that are fixed to a first adapter 3. Rotation of a finger screw on the first adapter 3 opens and closes the tweezers 2 allowing the grid 20 to be gripped and held. An electromagnet (MMT Magnettechnik GmbH & Co. Germany) 4 holds the tweezers 2 in the horizontal position, and the tweezers 2 are cooled via two small Peltier elements mounted on it. The electromagnet is fixed to a precision kinematic mount 5 (KS05K/M, Thorlabs GmbH, Germany), which itself is mounted on a manual z-axis stage. Thus, the grid 20 held by the tweezers 2 can be aligned and placed flat (horizontally), with the holy carbon side up, in a slot in the DP-stage 1. The slot has a small hole (2 mm diameter) at its center to allow the passage of a laser beam (see below). Except in this region, the outer rim and the lower surface of the grid 20 are in direct contact with the stage material. The DP-stage 1 itself is mounted on a motorized stage (Prior Scientific, UK) 6, allowing the positioned grid and tweezers to be moved on a horizontal plane. A second adapter 7 with another permanent magnet inserted is connected to a large solenoid 8 (HD8286-R-F, Kuhnke, Germany) via a pivot. This second adapter 7 can rotate freely around its pivot axis, but is held in a horizontal orientation by a small permanent magnet 9. The large solenoid 8 has a hub length of 30 mm and is controlled by a solenoid controller (MST-1630.001/002, Tremba GmbH, Germany) in such a way that the solenoid is actuated when a secondary circuit 10 is closed.

A fused silica microcapillary (New Objective, USA) 11 mounted on an assembly of linear stages (M-404.2PD and M-414.3PD, Physik Instrumente, Germany), is connected to a high-precision syringe pump (Cetoni GmbH, Germany) (not shown). The microcapillary is used to aspirate sample from a storage container, e.g., PCR tubes, well plates etc., or from a lysed single cell (Arnold, S. A., Albiez, S., Opara, N., Chami, M., Schmidli, C., Bieri, A., Padeste, C., Stahlberg, H., Braun, T., 2016. Total Sample Conditioning and Preparation of Nanoliter Volumes for Electron Microscopy. ACS nano 10, 4981-4988), and dispense it onto the grid on the DP-stage 1. Since the DP-stage 1 is mounted on a motorized stage, the grid 20 can be moved while the sample is being dispensed, allowing it to be distributed across a wider area of the grid 20, if required. Two CCD cameras (not shown) allow direct observation of sample deposition and spreading (side view and tilted top view, see FIG. 7). The microcapillary is retracted once this is complete.

After sample deposition, evaporation of the liquid is controlled by the temperature of the DP-stage 1 and can be monitored using a laser diode ($\lambda$=780 nm, CPS192, Thorlabs GmbH, Germany) 13 and a photodetector (photodiode PDA100A, Thorlabs GmbH, Germany) 14 with a manual aperture (SM1D12SZ, Thorlabs, Germany). The laser diode 13 is mounted above the DP-stage 1, illuminating the area of the grid 20 where sample was deposited. The photodetector 14 is positioned underneath the DP-stage 1 in the optical path of the laser diode 13.

Sample vitrification proceeds automatically when the laser signal registered by the monitoring system reaches a defined threshold or after a pre-set time defined by the user. Injection of the grid into the cryogen is triggered when the electromagnet 4 is turned off and the two magnets inside the adapters 3 and 7 snap together, withdrawing the tweezers 2 and grid 20 from the DP-stage 1. The newly formed assembly falls into the vertical position due to its increased weight. When the assembly reaches the vertical position, it automatically closes the secondary circuit 10, which triggers the large solenoid. The 30-mm solenoid hub shoots the EM grid and the tip of the tweezers 2 into the cryogen 12 (a mixture of ethane and propane (40:60) liquefied in a standard cryogen container from Vitrobot, FEI, USA with a custom-made Styrofoam lid to minimize ice contamination during plunge-freezing). Only a few hundred milliseconds pass from the moment the electromagnet 4 is turned off until the grid is immersed in the cryogen. The tweezers 2 can now easily be removed from the assembly by hand (magnetic connection) and the grid 20 can be placed in a grid-storage box immersed in liquid nitrogen and subsequently transferred to a storage Dewar or directly into a cryo-equipped electron microscope for observation.

CryoWriter: Control Software

All instruments are controlled via National Instruments LabVIEW software (Elliott, C., Vijayakumar, V., Zink, W., Hansen, R., 2007. National Instruments LabVIEW: A Programming Environment for Laboratory Automation and Measurement. JALA 12, 17-24). The openBEB framework (www.openbeb.org) is used to load each instrument program as an independent plug-in (Ramakrishnan, C., Bieri, A., Sauter, N., Roizard, S., Ringler, P., Müller, S. A., Goldie, K. N., Enimanev, K., Stahlberg, H., Rinn, B., Braun, T., 2014. openBEB: open biological experiment browser for correlative measurements. BMC Bioinf. 15, 84). Many experimental steps, such as sample loading, deposition, and cryoinjection have been automatized using the macro language of openBEB. FIG. 7 shows a screenshot of the control software, including the macro window for process automation.

Real-Time Monitoring of Water Thickness by a 780 nm Laser Diode

If the grid and stage are kept at the dew point temperature, the relative humidity (rH) of the microenvironment in proximity to the grid is 100%. To prevent water condensation and allow controlled evaporation of sample water from the grid surface, the stage temperature needs to be slightly above the dew point temperature, e.g., the temperature offset is chosen to give 90% rH at the grid surface.

(I) rH of the DP-Stage/Grid Microenvironment and Sensitivity to rH of the Room

Calculations show that for small offsets from the dew point temperature (e.g., +2° C.), the rH of the DP-stage microenvironment is linearly dependent on the stage temperature over room rHs ranging from 20% to 90% at a room temperature of 23° C. (FIG. 8A). Further, the temperature offset needed to create a 90% rH microenvironment on the stage, varies by less than 0.3 degrees for room rHs ranging from 20% to 90% at 23° C. (FIG. 8B). Thus, the cryoWriter procedure is not sensitive to rH changes in the room, and the system does not necessarily require a humidity-controlled chamber, however, this might be desirable for future applications.

The rH at a temperature T, rH(T), was calculated as follows:

$$rH(T) = 100\frac{E(RT)}{E_S(T)} = e^{17.62\left(\frac{RT}{243.12+RT} - \frac{T}{243.12+T}\right)} \cdot rH(RT)$$

$$\text{with } E(RT) = E_S(RT)\frac{rH(RT)}{100} \text{ and } E_S(T) = 611.2e^{\frac{17.62\,T}{243.12+T}}$$

Where E(RT) and $E_S$(T) are the actual vapor pressure (in Pascal) at room temperature RT and the maximum (saturated) vapor pressure at a temperature T, respectively, as described by the Magnus formula (Alduchov, O. A., Eskridge, R. E., 1996. Improved magnus form approximation of saturation vapor pressure. Journal of Applied Meteorology 35, 601-609).

In agreement with the above conclusions, when larger sample volumes were deposited by protocol 1, it generally sufficed to determine the time lag required between sample deposition and pick-and-plunge freezing using buffer aliquots, the degree of thinning did not need to be monitored experimentally.

(II) Dependence of Laser Transmission on Sample-Layer Thickness

The cryoWriter setup allows, water evaporation to be experimentally monitored by an optical system consisting of a 780 nm laser diode and a photodetector. This is an option to the above, and is particularly important for deposition protocol 2. The transmission of an almost perpendicular laser beam through the grid is measured (see FIGS. 1 and 2). Changes in film thickness due to evaporation affect the amplitude of the signal recorded by the photodetector (FIG. 3). To confirm that these signal changes are dominated by interference effects, the transmitted signal was measured for laser diodes emitting at different wavelengths (780 nm and 405 nm). As expected from interference theory (FIG. 8C), the two patterns were qualitatively the same and the positive peak of the blue laser signal was shifted towards thinner water layers (FIG. 8d).

LIST OF REFERENCE SIGNS

| 100 | System |
|---|---|
| 1 | Temperature-controlled stage |
| 2 | Tweezers |
| 3 | First adaptor |
| 4 | Electromagnet |
| 5 | Adjustment means |
| 6 | Translation stage assembly |
| 7 | Second adaptor |
| 8 | Movement generating means, particularly solenoid |
| 9 | Permanent magnet |
| 10 | Secondary electrical circuit |
| 11 | Dispensing head, particularly microcapillary tip |
| 12 | Container |
| 13 | Light source |
| 13a | First light source |
| 13b | Second light source |
| 14 | Photodetector |
| 14a | First photodetector |
| 14b | Second photodetector |
| 15a | First dichroic mirror |
| 15b | Second dichroic mirror |
| 16a | First aperture |
| 16b | Second aperture |
| 20 | Support structure |
| 30 | Control device |
| 50 | Holding means |
| 60 | Transfer mechanism |
| 61 | Rotating hinge |
| 80 | Cryogen |
| G | Gap |
| L | Light path |
| L1 | First light beam |
| L2 | Second light beam |
| T | Transmitted light beam |
| T1 | First transmitted light beam |
| T2 | Second transmitted light beam |

The invention claimed is:

1. Method for preparing a sample on a support structure (20), wherein
the sample is provided as a thin film having a film thickness on a support structure (20);
the temperature of the support structure (20) is adjusted to a value above the dew point temperature of the environment, such that the film thickness decreases;
light is directed at the support structure (20);
at least one intensity value of the light transmitted by the support structure (20) is measured;
the support structure (20) is automatically inserted into a liquid cryogen (80) dependent on the at least one measured intensity value, such that the sample is cooled down to an amorphous solid.

2. The method according to claim 1, wherein the support structure (20) is automatically inserted into the liquid cryogen (80) when the at least one measured intensity value exceeds a pre-determined threshold.

3. The method according to claim 1, wherein the temperature of the support structure (20) is adjusted to a value 2° to 8° above the dew point temperature of the environment.

4. The method according to claim 1, wherein the film thickness is decreased by blotting or re-aspiration prior to adjusting the temperature to a value above the dew point temperature of the environment.

5. The method according to claim 1, wherein the wavelength of the light is in the near infrared range, wherein particularly the wavelength is 780 nm or more.

6. The method according to claim 1, wherein the light is directed at the support structure (20) along a light path (L) which is perpendicular to the surface of the support structure (20).

7. The method according to claim 1, wherein the sample is provided onto the support structure (20) by aspirating a pre-defined amount of the sample into a capillary and dispensing the sample onto the support structure (20) by means of the capillary.

8. The method according to claim 1, wherein an additional calibration step is performed, wherein the light is directed at a reference support structure (20) that is free from the sample, and wherein at least one reference intensity value of the light transmitted by the reference support structure (20) is measured, and wherein the support structure (20) carrying the sample is automatically inserted into the liquid cryogen (80) dependent on the ratio of the at least one measured intensity value and the at least one reference intensity value.

9. The method according to claim 1, wherein the light directed at the sample comprises at least light of a first wavelength, particularly in the range between 600 nm and 900 nm, more particularly in the range between 780 nm and 880 nm or in the range between 630 nm and 670 nm, and light of a second wavelength, particularly in the range between 350 nm and 500 nm, more particularly in the range between 405 nm and 450 nm.

10. System (100) for preparing a sample on a support structure (20) comprising
a support structure (20) that is configured to accommodate a sample,
a temperature-controlled stage (1) that is configured to keep the support structure (20) at a pre-defined temperature when the support structure (20) is arranged on the temperature-controlled stage (1),
a transfer mechanism (60) that is configured to move the support structure (20) from the temperature-controlled stage (1) into a container (12) containing a liquid cryogen (80) so that the sample on the support structure (80) contacts the cryogen (80),
characterized in that the system (100) comprises
a light source (13) that is configured to provide light directed at the support structure (20),
a photodetector (14) that is configured to measure at least one intensity value of the light transmitted by the support structure (20),
a control device (30) that is configured to receive said measured intensity value from the photodetector (14) and trigger the transfer mechanism (60) dependent on the at least one measured intensity value, such that the support structure (20) is inserted into the container (12) containing the liquid cryogen (80).

11. System (100) according to claim 10, characterized in that the light source (13) is adapted to emit the light along a light path (L), wherein the support structure (20) and the photodetector (14) are arranged along the light path (L), such that at least a part of the light travels from the light source (13) along the light path (L) via the support structure (20) to the photodetector (14), wherein particularly the support structure (20) is arranged perpendicular to the light path (L).

12. System (100) according to claim 10, characterized in that the system (100) comprises a first adapter (3) configured to hold the support structure (20), wherein the transfer mechanism (60) is configured to be connected to the first adapter (3) holding the support structure (20), and wherein the transfer mechanism (60) is configured to pivot the first adapter (3) together with the support structure (20) into a vertical position above the container (12) and to move the first adapter (3) and the support structure (20) downwards after said pivoting so that the sample on the support structure (20) contacts the cryogen (80) in the container (8).

13. System (100) according to claim 12, characterized in that the system (100) comprises an adjustment means (5) configured to hold the first adapter (3) with respect to the temperature-controlled stage (1) in an adjustable manner, wherein the adjustment means (5) comprises a holding means (50), particularly in the form of an electromagnet (50), that is configured to releasably hold the first adapter (3) and to automatically release the first adapter (3) when the sample is positioned on the support structure (20).

14. System (100) according to claim 12, characterized in that the transfer mechanism (60) comprises a second adapter (7), wherein the first adapter (3) and the second adapter (7) are designed to engage with each other when the holding means (50) releases the first adapter (3), and wherein the transfer mechanism (60) is designed to pivot the second adapter (7) above said container (12) when the first adapter (3) is engaged with the second adaptor (7) and released from the holding means (50).

15. System (100) according to claim 10, characterized in that the system (100) comprises a liquid handling system comprising a dispensing head (11), wherein the liquid handling system is configured to aspirate and dispense a volume of a sample via the dispensing head (11), wherein the system (100) further comprises a first reservoir, into which the dispensing head (11) containing a nanoliter volume of a sample can be immersed so as to allow diffusion-controlled sample conditioning, e.g. for desalting or exchange of buffer prior to deposition on the support structure (20).

\* \* \* \* \*